US012409098B2

(12) United States Patent
Curley

(10) Patent No.: US 12,409,098 B2
(45) Date of Patent: Sep. 9, 2025

(54) NUTATING MASSAGE DEVICE

(71) Applicant: Charles Curley, Cortland, NY (US)

(72) Inventor: Charles Curley, Cortland, NY (US)

( * ) Notice: Subject to any disclaimer, the term of this patent is extended or adjusted under 35 U.S.C. 154(b) by 85 days.

(21) Appl. No.: 18/443,569

(22) Filed: Feb. 16, 2024

(65) Prior Publication Data

US 2025/0262116 A1 Aug. 21, 2025

(51) Int. Cl.
*A61H 15/00* (2006.01)

(52) U.S. Cl.
CPC . *A61H 15/0085* (2013.01); *A61H 2201/0153* (2013.01); *A61H 2201/1207* (2013.01); *A61H 2201/14* (2013.01); *A61H 2201/1661* (2013.01); *A61H 2201/1669* (2013.01); *A61H 2201/1673* (2013.01); *A61H 2201/1695* (2013.01); *A61H 2201/5035* (2013.01)

(58) Field of Classification Search
CPC ........ A61H 15/0085; A61H 2201/0153; A61H 2201/1207; A61H 2201/14; A61H 2201/1661; A61H 2201/1669; A61H 2201/1673; A61H 2201/1695; A61H 2201/5035
See application file for complete search history.

(56) References Cited

U.S. PATENT DOCUMENTS 4,412,535 A * 11/1983 Teren ................. A61H 15/0078 601/126
4,481,939 A * 11/1984 Mabuchi ............ A61H 15/0085 601/118
4,729,368 A * 3/1988 Guitay ................... A61H 7/008 601/123
4,786,269 A * 11/1988 Nagel .................... A63H 31/00 446/464
5,215,078 A 6/1993 Fulop
5,665,053 A * 9/1997 Jacobs ................... A61H 7/008 601/123
6,213,964 B1 * 4/2001 Pesovic ................ A61H 9/0028 601/123
6,517,499 B1 2/2003 Pereira
6,589,098 B2 * 7/2003 Lee ...................... A63H 17/004 446/469
7,147,611 B2 12/2006 Kassel
7,169,120 B2 1/2007 Murdock
7,634,314 B2 12/2009 Applebaum
7,699,794 B2 4/2010 Meyer
7,806,840 B2 10/2010 Chen
(Continued)

FOREIGN PATENT DOCUMENTS

KR 20160097636 * 8/2016

*Primary Examiner* — Justine R Yu
*Assistant Examiner* — Matthew R Moon
(74) *Attorney, Agent, or Firm* — Chris Tanner; FYPA PLLC

(57) ABSTRACT

A handheld, motorized massage device includes four rollers having stimulating projections which each rotate upon motor-driven nutating axles to produce massage contact forces that pulsate bidirectionally along three orthogonal axes. Simultaneously, opposing pairs of nutating rollers counter rotate to produce alternating stretching and compression forces along the massage-receiving fascia surface. The nutating device combines the deep fascia benefits of percussive massage devices with the superficial fascia stretching benefits of rolling massage devices.

12 Claims, 21 Drawing Sheets

(56) References Cited

U.S. PATENT DOCUMENTS

| | | | | | |
|---|---|---|---|---|---|
| 9,295,607 | B2 | 3/2016 | Rosenberg | | |
| 10,004,658 | B2 | 6/2018 | Marty | | |
| 10,143,617 | B2 | 12/2018 | Nelson | | |
| 10,182,962 | B2 | 1/2019 | Godfrey | | |
| 10,492,980 | B2 | 12/2019 | Giraud | | |
| 10,561,574 | B1 | 2/2020 | Marton | | |
| 10,729,614 | B2 | 8/2020 | Marton | | |
| 10,842,703 | B2 | 11/2020 | Zhang | | |
| 10,881,577 | B2 | 1/2021 | Hashimoto | | |
| 10,945,915 | B2 | 3/2021 | Wersland | | |
| 10,959,908 | B2 | 3/2021 | Lee | | |
| 11,083,666 | B2 | 8/2021 | Jeong | | |
| 11,376,187 | B2 | 7/2022 | Zhao | | |
| 11,478,397 | B1 | 10/2022 | Gonglach | | |
| 11,497,676 | B2 | 11/2022 | Liu | | |
| 11,559,462 | B2 | 1/2023 | Wersland | | |
| 11,654,076 | B2 | 5/2023 | Cross | | |
| 11,684,539 | B2 | 6/2023 | Ferber | | |
| 11,717,465 | B2 | 8/2023 | Nelson | | |
| 2008/0058687 | A1 * | 3/2008 | Cheng | .................... | A61H 7/007 |
| | | | | | 601/123 |
| 2020/0261306 | A1 | 8/2020 | Pepe | | |
| 2022/0160578 | A1 | 5/2022 | Curley | | |
| 2023/0233401 | A1 | 7/2023 | Wu | | |

* cited by examiner

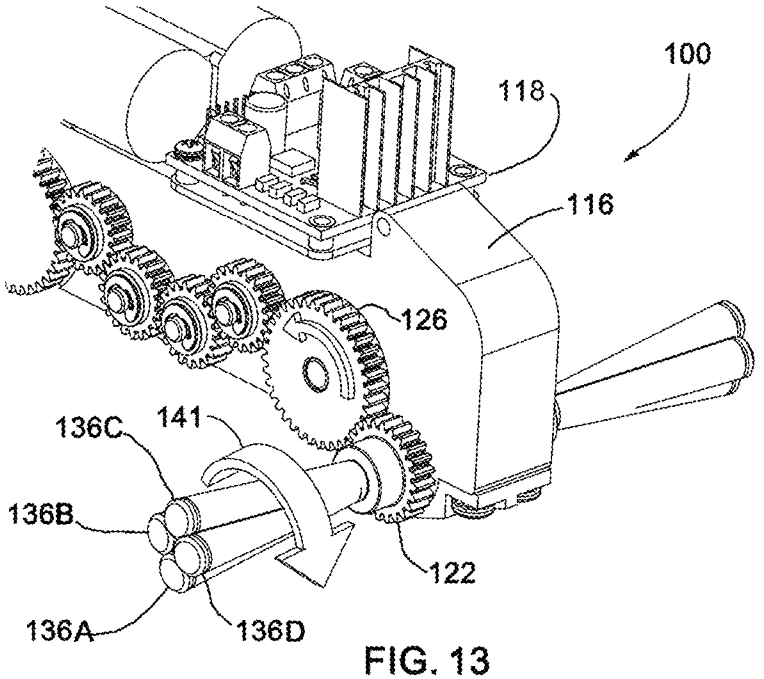
FIG. 13
FIG. 14
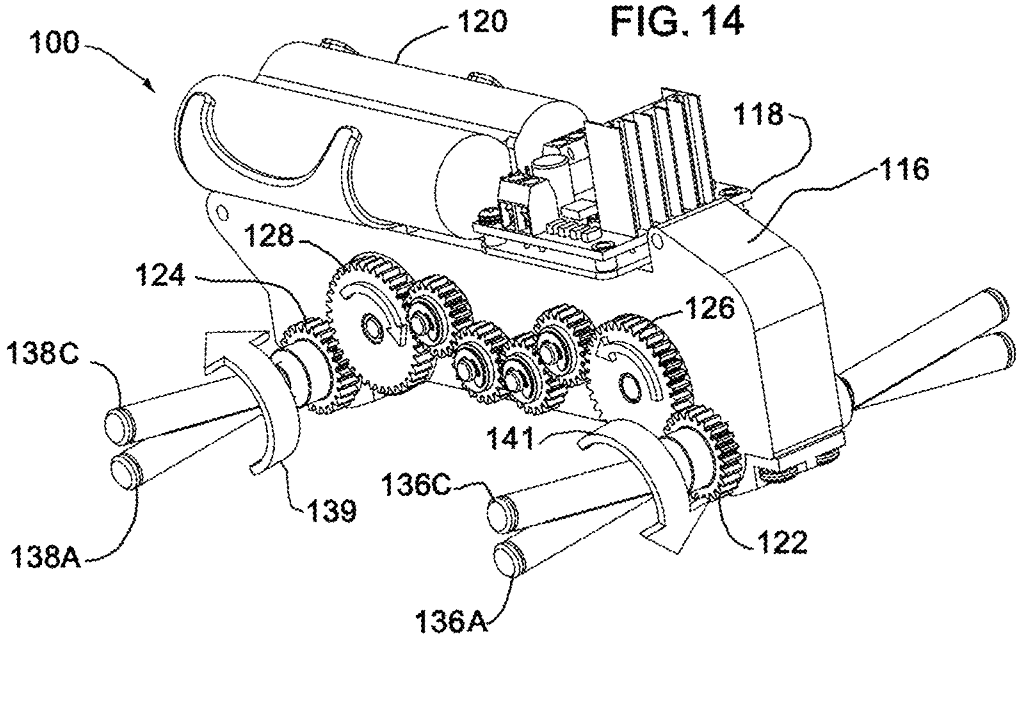

FIG. 20
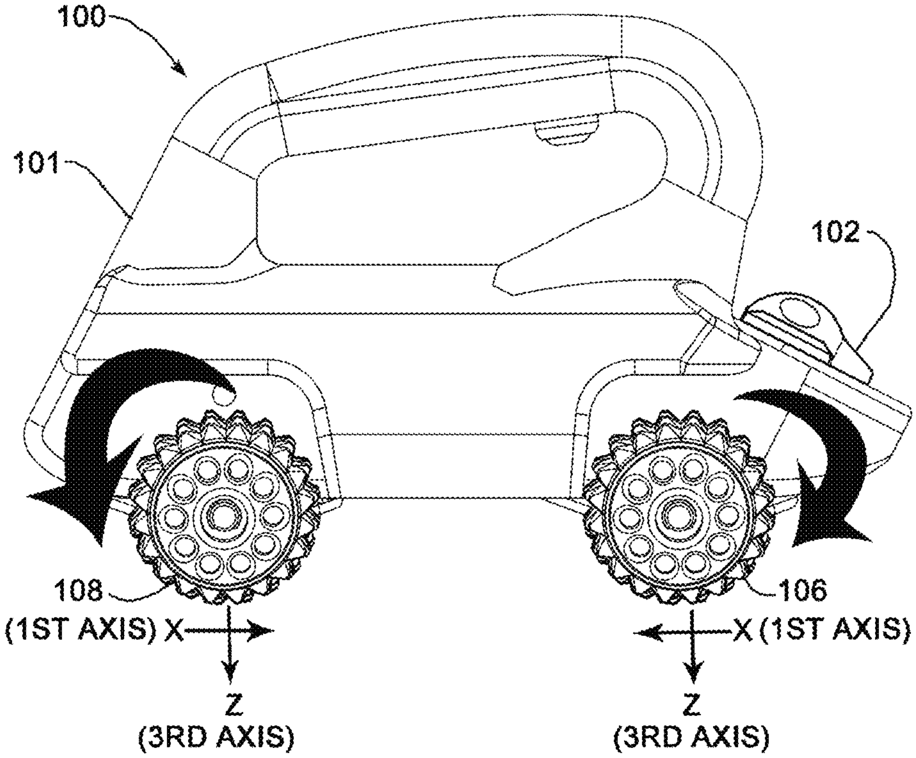
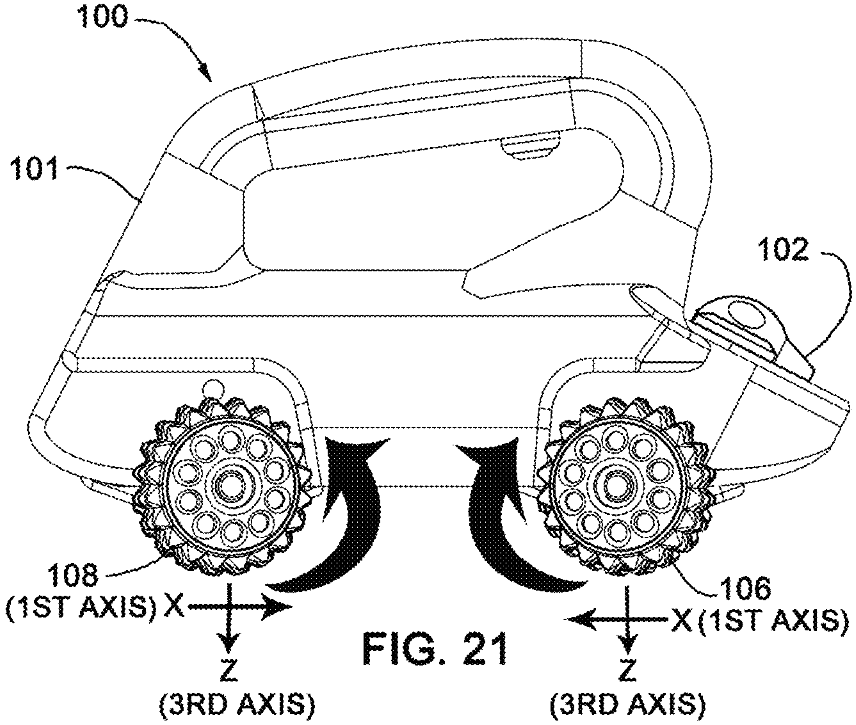
FIG. 21

FIG. 24
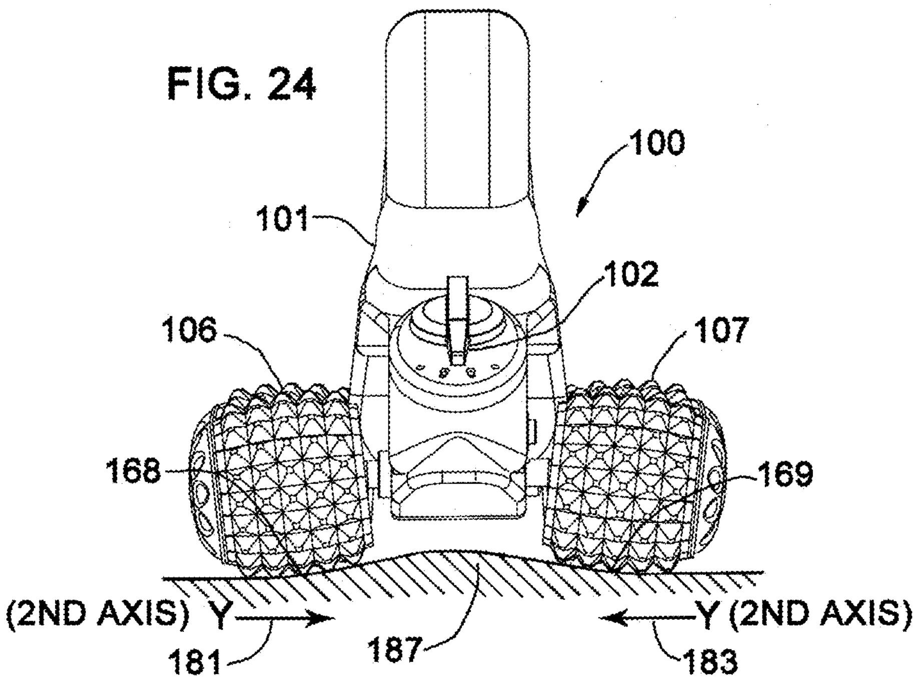
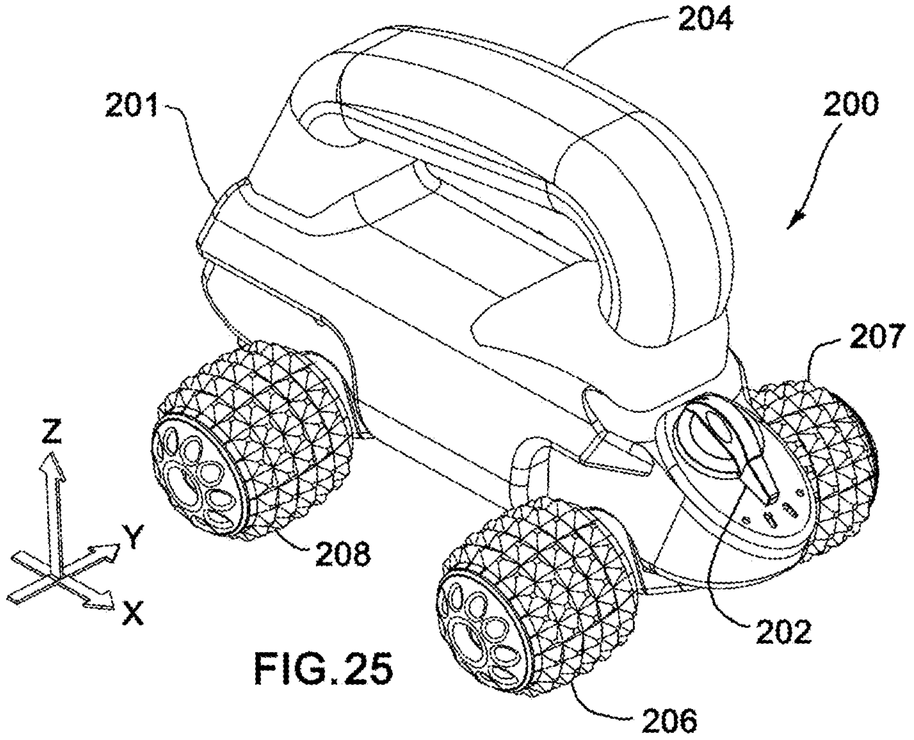
FIG.25

FIG. 32
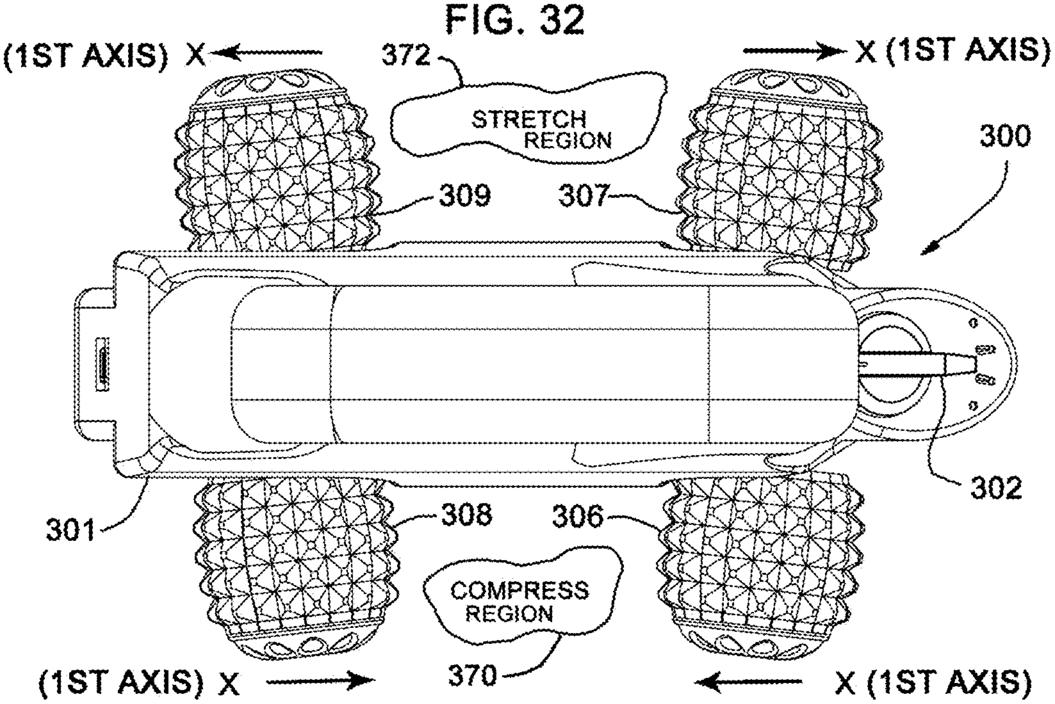
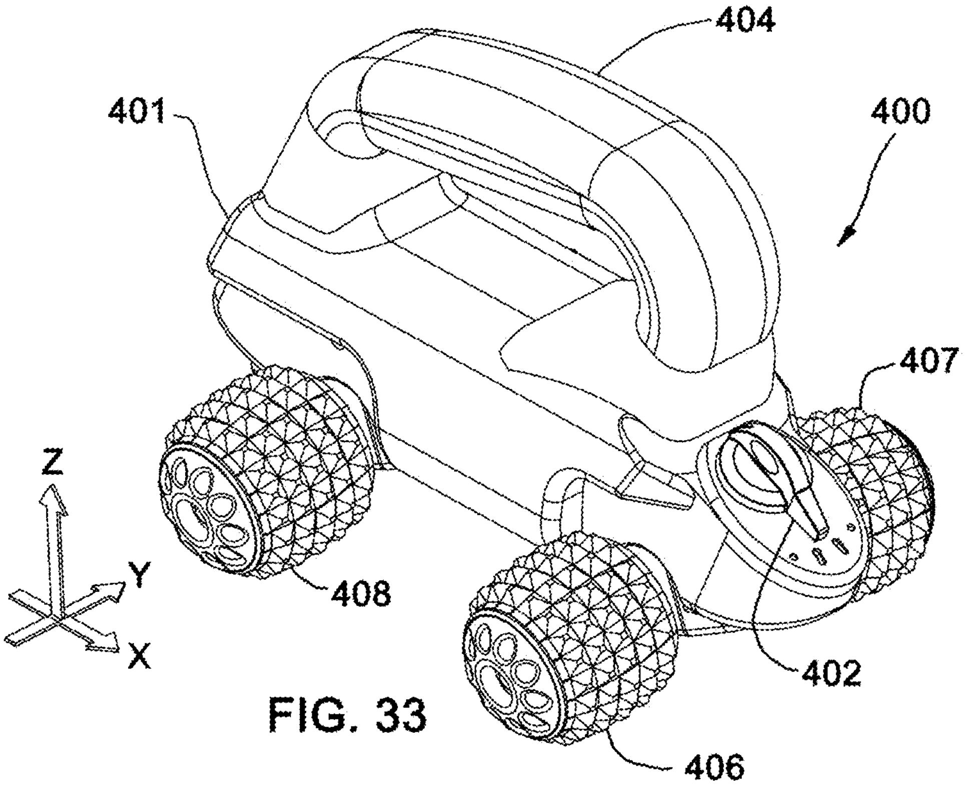
FIG. 33

NUTATING MASSAGE DEVICE

BACKGROUND

The invention herein is in the fields of percussive and rolling massage devices that apply vibratory massage impulses to selected fascia and muscle groups of the human body.

Percussive massage is the process of using rapid repeated impulses of short duration to specific muscle groups of the human body. While originally performed with the human hands of massage therapists, tools called "massage guns" have more recently become available to perform this type of massage therapy. Massage guns are handheld electromechanical devices which provide repeating mechanical impulses to an impulse head that is pressed against specific areas of the human body. An example is shown in FIG. 1 (Prior Art). While the user holds the impulse head against an area of the body, the motorized device causes the head to rapidly oscillate along axis 904 with various forces and frequencies which are adjustable by the user. The contact surfaces of massage gun heads are shaped like spheres, cups and forks, which are usually provided as exchangeable attachments that snap into the vibrating end of the massage gun. Many massage gun patents have been granted which differ by the structure of the mechanism which produces the reciprocating plunger motion.

The outer layers of the human anatomy consist of superficial fascia (just below the skin) and deep fascia, which surrounds muscles. Massage guns are said to treat muscles and the deep fascia that surrounds those muscles. They are said to treat sore muscles after exercise, to increase blood circulation, to relieve muscle stiffness, to increase range of joint movement and to reduce inflammatory muscle reaction.

Rolling massage devices are said to treat the superficial fascia layers by stimulating blood flow and breaking down fat cells. Deep massage using rolling massage devices has been proven in clinical trials to be an effective treatment for cellulite, and variations of these devices are marketed as "Anti-Cellulite Massagers". Some of these devices possess controls which allow the user to adjust the frequency of the vibratory impulses. An example of a typical battery powered massage gun configuration is shown in FIG. 1 (Prior Art). Many other similar configurations are on the market whereupon the device is grasped in the fashion of holding a pistol.

Specifically, FIG. 1 shows a common configuration of a prior art percussive massage gun 900. A percussive massage head 905 with a spherical shape is mounted on the end of a piston 906 that reciprocates in the direction of the axis of the arrow 904 within the housing 902 to create a reciprocating plunging movement of the head 905. The main housing 901 has a cylindrical extension 903 which houses a battery-driven motor. The cylindrical battery assembly 918 has the dual functions of housing the battery and also acting as the handle for the massage gun 900. The user grips the cylindrical extension 918 in a way similar to grasping a pistol, and then presses the massage head 905 against the target muscle or tissue of the human body. The vibration is initiated by engaging an "ON" switch. This type of massage device produces only up and down reciprocating motion of the massage head 905. Additionally, the person holding these devices experiences a "reactionary bounce" which causes difficulty in holding the device steady over a chosen muscle target.

The effectiveness of the massage gun depends upon the user's ability to hold the gun steady while applying pressure to the target muscle location. The vibratory action of the reciprocating head causes an equal and opposite reaction at the user's hand, which makes it difficult to hold the gun focused at the target location, especially at low oscillation speeds. The reaction on the user also causes fatigue when attempting to focus the gun in a specific location for a sustained period of time.

Other types of massage devices utilize rollers that allow the massage device to traverse along the massage-receiving surfaces. These devices are also said to treat sore muscles after exercise, to increase blood circulation, to relieve muscle stiffness, to increase range of joint movement and to reduce inflammatory muscle reaction. These devices tend to longitudinally stretch muscles and/or the superficial fascia, and are additionally said to be effective in treating cellulite.

FIG. 2 (Prior Art) shows an example of a prior art handheld roller massage device. The projections 804 on this device are said to induce blood microcirculation as the user traverses the device along the massage-receiving surface. This device additionally provides heat to the roller's stimulating projections. This type of device is said to be of the "passive type" because the massage force may only be induced in response to the user's applied motion. The roller is capable of producing a single downward massage force vector as induced by the user's pressure upon the handle 810.

Another passive roller massage device is taught by U.S. Pat. No. 10,143,617B2 (2018) as summarized in FIG. 3 (Prior Art). This disclosure teaches the use of multiple rollers mounted on a semi-flexible axle. Each roller 721 is capable of producing a single massage force vector as induced directly by the user's pressure upon the handles 737 and 738. The user's pressure results in a vectored massage force as indicated by arrow 716 as the user moves the frame 701 laterally along the direction indicated by arrow 712. The massage rollers of this device roll freely as shown by arrow 732, but are incapable of providing percussive massage forces.

U.S. Pat. No. 10,004,658 B2 (2018) describes a passive massage device that is said to treat cellulite, of which an aspect is shown in FIG. 4 (Prior Art). The prior art device 1600 utilizes two freely rotating rollers 1601 and 1602 that are elastically attached to the base within the interior portion of a cup-like housing 1600. A user drags the rim of the housing along the surface of the massage-receiving surface in the direction shown by arrow 1690 as a cosmetic fluid is dispensed to lubricate the fascia surface. The interior massage rollers 1601 and 1602 are thus induced to rotate about axis 1611 and 1612 by the user's motion. Each roller "comprises a plurality of polygonal discs with rounded angles, juxtaposed according to the axis of rotation". Further, the "notched shape of the rollers, combined with their secant axes of rotation makes it possible to obtain, during the displacement of the device applied to the skin, a kneading effect." Each roller of this device is limited to providing a constant massage vector force in only one direction in response to the pressure provided by the elastic arm suspension. That massage force is orthogonal to the massage receiving surface. A deficiency of this invention resides in the fact that a lubricant is required to facilitate comfort when dragging the rim of the device along the massage-receiving fascia surface.

The device shown in FIG. 5 (Prior Art) combines the benefits of rolling massage with the benefits of percussive massage. Specifically, US patent application 2022/016 0578 teaches an active massage device with rollers that may be traversed along the massage-receiving surface in the direction shown by arrow 1244. The device possesses two stabilizing rollers 1220 and 1230 which freely rotate upon axle 1211. A third roller 1224 is mounted on a motor-driven piston that pulsates bidirectionally with an up and down reciprocating motion along a single vector indicated by arrow 1248. The roller 1224 also rotates freely upon axle 1240 as the user traverses the assembly 1200 along the massage-receiving surface. The axles 1240 and 1211 are fixed to the device in a direction that is orthogonal to the direction 1244. The stabilizing rollers act to relieve the "reactionary bounce" problem encountered by the user in holding a conventional massage gun steady. However, none of the rollers 1220, 1230, or 1224 produce 3-dimensional massage contact forces upon the massage-receiving fascia. Furthermore, none of the rollers induce opposing forces in a direction parallel to the massage-receiving surface to stretch the fascia.

SUMMARY OF THE INVENTION

A preferred embodiment is shown in FIG. 6 which illustrates a handheld, motorized massage device that utilizes four massage rollers with stimulating projections that are each mounted on nutating axles. The device combines the advantages of percussive massage and the advantages of rolling massage while providing unique 3-dimensional massage force vectors at each roller. Each of the four nutating rollers produces unique massage force vectors bidirectionally along three orthogonal axes against the massage-receiving fascia region beneath that roller. Additionally, the front and rear nutating axles are synchronized to produce opposing rotational motion which acts to stretch and compress the regions along the planar surface of the massage-receiving fascia between the front and rear massage rollers. This reciprocating stretching action, combined with a percussive massage action, simulates the actions of massage therapists which are said to be effective in treating cellulite and repairing muscle damage.

Alternate embodiments are explained whereupon the nutation angle of each peripheral end of the nutating axles are diametrically opposed in order to produce a different type of 3-dimensional massage vector. In one alternate embodiment, the stretching motion along the fascia surface is synchronously alternated between the right and left nutating roller pairs.

In some embodiments, the motion of the front and rear rollers are synchronized mechanically, such as by gears or timing belts. In other embodiments, the two nutating axles are driven by independent motors which are electronically synchronized.

Additional embodiments describe variants where only two of the four rollers nutate while the remaining two rollers act as stabilizers. In all embodiments, the user may hold the device stationary upon a target fascia region, or alternatively, traverse the device with reciprocating motion along the massage-receiving surface.

This disclosure frequently uses the words "nutating", "nutation", and "nutate" which may be perhaps obscure. The act of nutating refers to rocking, swaying or wobbling motion of a feature or features as they rotate about a common axis.

BRIEF DESCRIPTION OF THE DRAWINGS

FIG. 13 is an isometric view of the front nutating axle of the first embodiment showing the tip of the axle superimposed into four rotational positions.

FIG. 14 is an isometric view of the front nutating axle and rear nutating axle of the first embodiment showing the tips of the axles superimposed in two rotational positions designated as 6 o'clock and 12 o'clock.

FIG. 20 is a right side view of the massage device of the first embodiment showing the right front roller having moved to the 6 o'clock positions and right rear roller having moved to the 6 o'clock position.

FIG. 21 is a right side view of the massage device of the first embodiment showing the right front roller having moved to the 9 o'clock positions and right rear roller having moved to the 3 o'clock position.

FIG. 24 is a frontal view of the massage device of the first embodiment showing the contact regions of the left front roller and the right front roller having moved towards each other along the Y-axis.

FIG. 25 is an isometric view of a second embodiment of the nutating massage device.

FIG. 32 is the same top view of the fourth embodiment as shown in FIG. 31 with the massage rollers shown at the opposite synchronized extremes along the X-axis.

FIG. 33 is an isometric view of a fifth embodiment of the nutating massage device.

DETAILED DESCRIPTION

Figure 1:
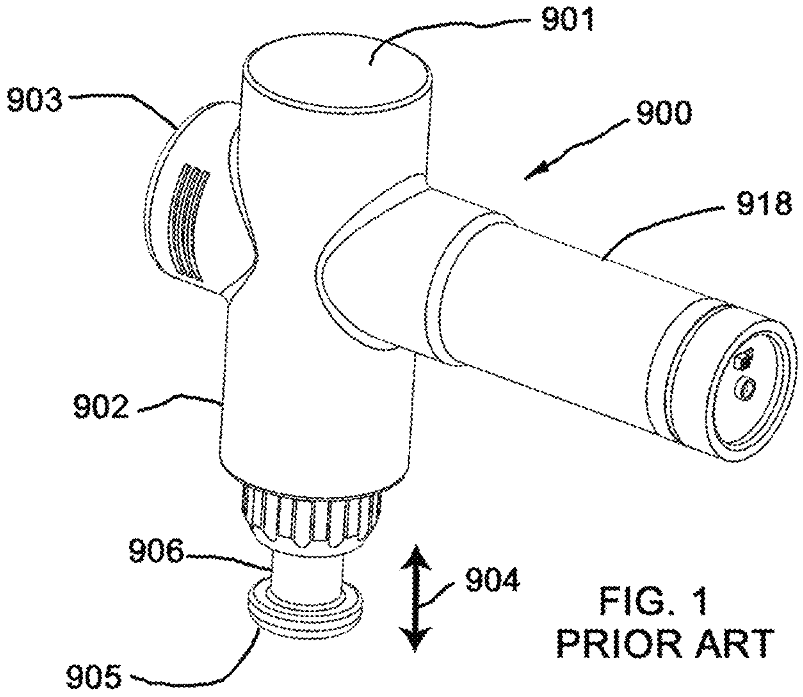
FIG. 1 PRIOR ART
FIG. 1 (Prior Art) shows a common configuration of a prior art percussive massage gun.
Figure 2:
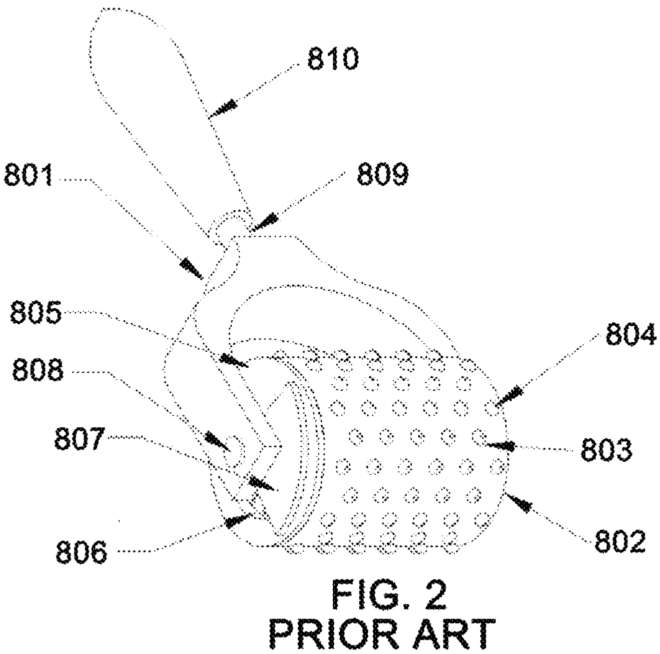
FIG. 2 PRIOR ART
FIG. 2 (Prior Art) shows an example of a prior art handheld roller massage device.
Figure 3:
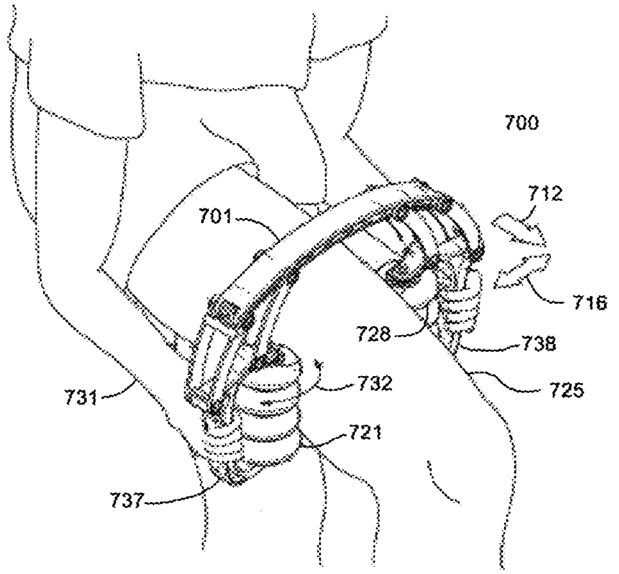
FIG. 3 PRIOR ART
FIG. 3 (Prior Art) shows an example of a prior art multi-roller handheld massage device.
Figure 4:
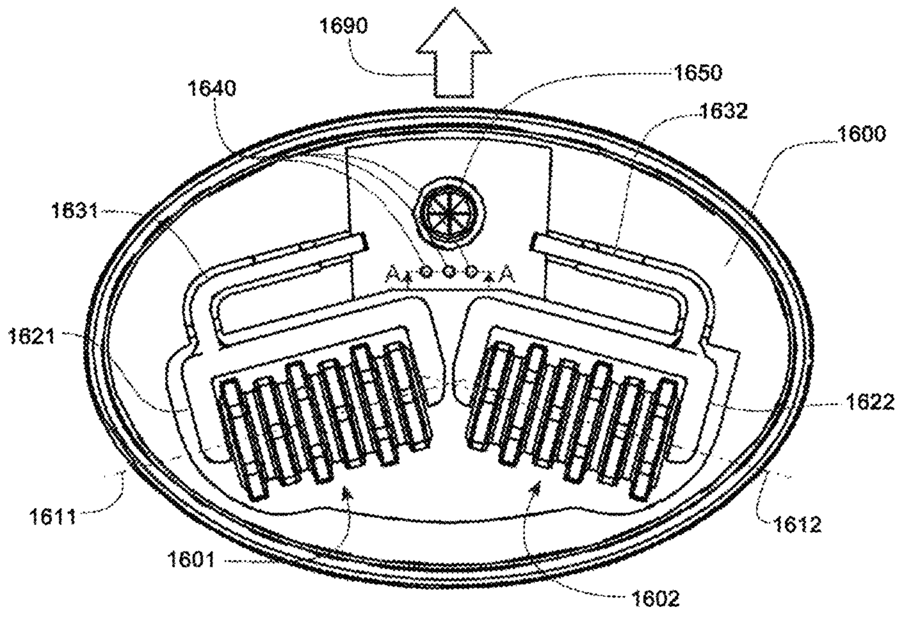
FIG. 4 PRIOR ART
FIG. 4 (Prior Art) shows an example of a prior art multi-roller passive massage device.
Figure 5:
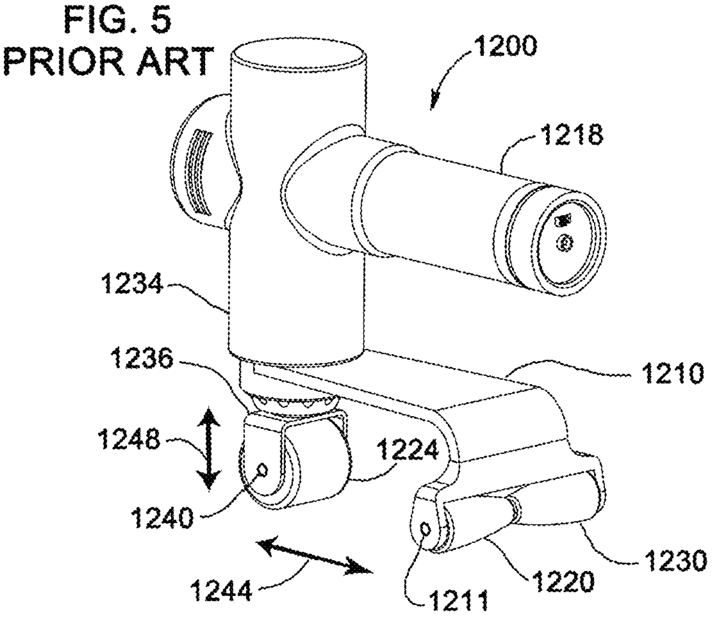
FIG. 5 PRIOR ART
FIG. 5 (Prior Art) shows an example of a prior art hybrid massage device that combines the benefit of percussive massage with the stability advantage of rolling massage devices.
Figure 6:
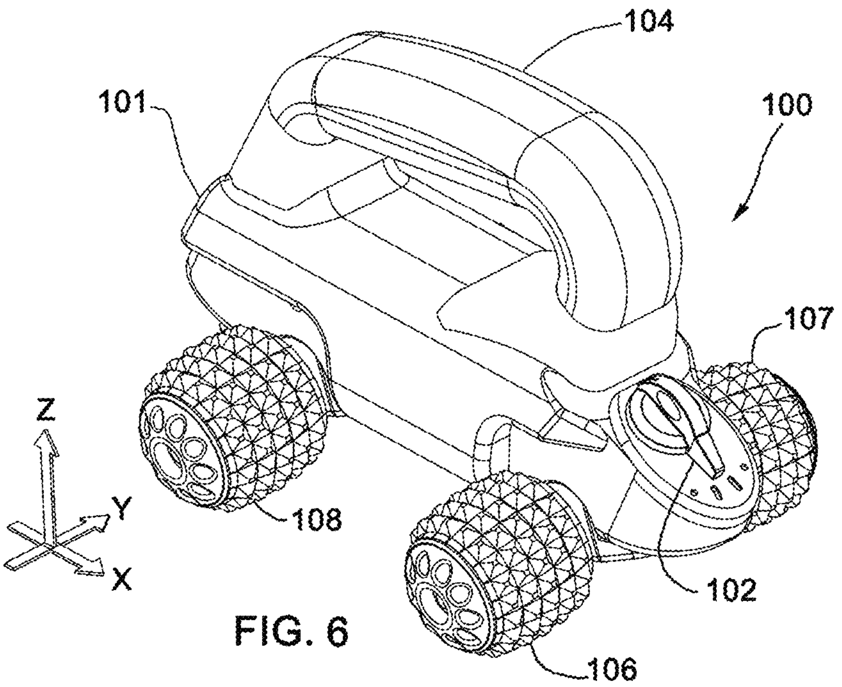
FIG. 6 is an isometric view of a first embodiment of a nutating massage device.

FIG. 6 illustrates a preferred embodiment of the massage device disclosed herein which includes four massage rollers which are rotatably mounted on two nutating axles which cause the rollers to rotate in a coordinated wobbling fashion. The device 100 consists of a casing body 101 which includes a handle portion 104. The front rollers 106 and 107 are freely rotatable upon a first nutating axle (the front axle) and the rear rollers 108 and 109 (not shown) are freely rotatable upon second nutating axle, which is designated herein as the rear nutating axle. Each of the two axles are rotationally driven by a battery-powered motor 130. The speed of the nutating axle motion is controlled by the velocity of the battery-powered drive motor 130 which is mounted internally within the casing 101. The operator controls the motor speed by setting the position of the speed control knob 102. The reference axes X, Y, and Z are shown to orient the vectors showing the multiple directions of the massage forces as further explained below.

In general, the operator grasps the device by the handle portion 104 and exerts pressure along the negative Z axis. The operator may use the device in two different modes. In the first mode, the operator may hold the device stationary over the target region. Alternately, the device may be freely traversed back and forth along the X-axis of the massage receiving regions in the second operational mode. In either mode, bidirectional pulsating forces are induced along three orthogonal directions at the contact region under each massage roller. In addition, stretching and compression of the fascia is induced along the directions of the "stretching axes" herein, including along the X-axis and the Y-axis.

The second mode is called the "freely traversable" mode. In the context of this disclosure, the term "freely traversable" means that the device can be traversed along the massage-receiving surface while inducing three-dimensional pulsations at each roller contact, and without causing any massage roller to skid or drag along the massage-receiving surface.

Figure 7:
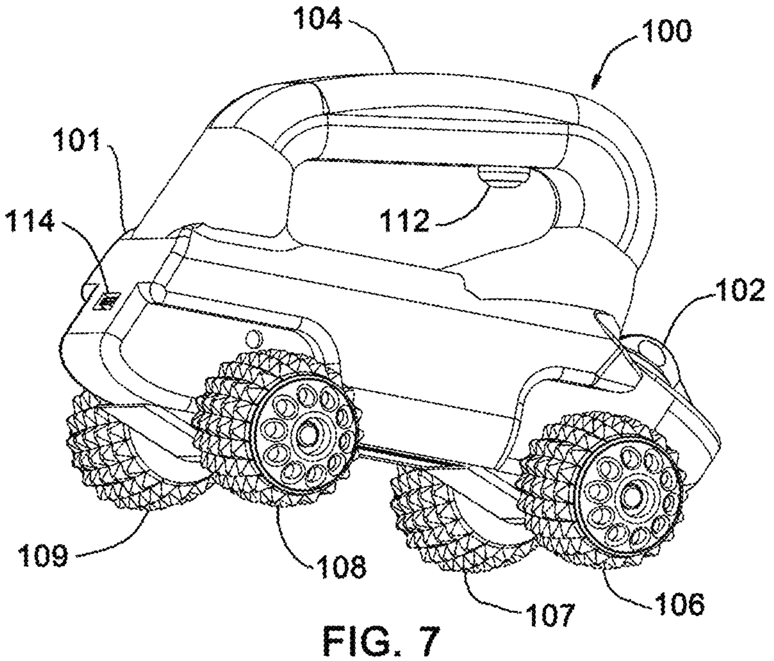
FIG. 7 is an alternate isometric view of the first embodiment shown in FIG. 6.

FIG. 7 is a rear lower isometric view of the massage device 100 which shows the front nutating rollers 106 and 107, in addition to the rear nutating rollers 108 and 109. A trigger button 112 is shown on the underside of the handle portion 104. The trigger button 112 is used by the operator to actuate the motor-driven nutating axles, where the term "motor-driven" means that the axles are rotationally powered by the motor. Speed control knob 102 is adjustable by the operator to control the rotational velocity of the nutating axles which induce identical nutation of the rollers mounted thereon. Charging port 114 is used to charge the internal batteries which power the motor.

Figure 8:
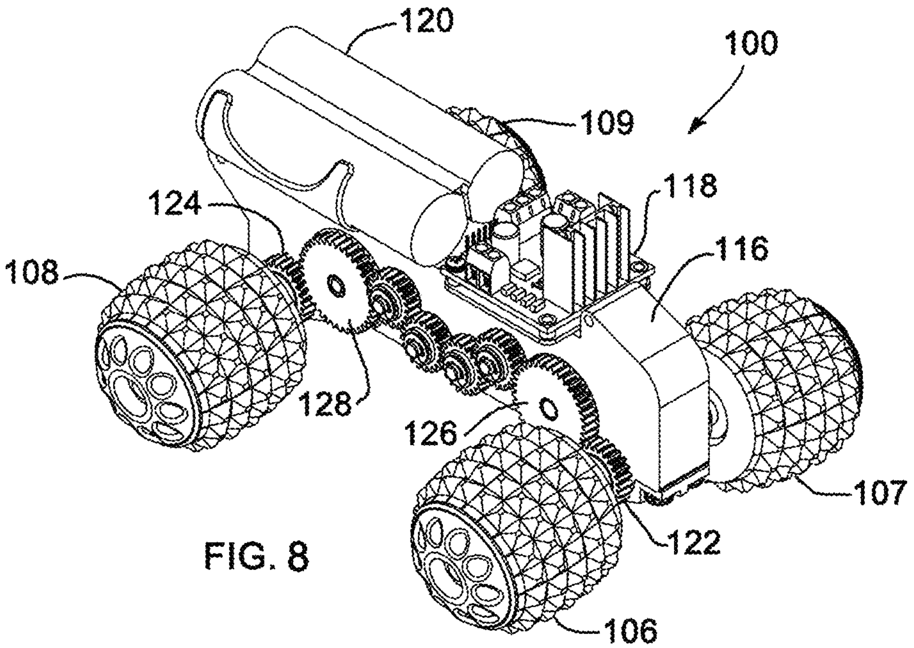
FIG. 8 is an isometric view of the nutating massage device of the first embodiment with the outer casing removed.

FIG. 8 is a front isometric view of the massage device 100 with the outer casing removed in order to show the arrangement of the internal components which are attached to the main frame 116. This view is looking at the right side of the device 100. A pair of batteries 120 is shown attached to the frame 116 just rearward of an electronic assembly 118 which possesses the motor control and battery charging circuitry. The batteries could be of the NICAD, lithium ion, sodium ion or other known battery types. The front nutating rollers 106 and 107 are driven by pinion 122 which is driven by gear 126. Rear nutating rollers 108 and 109 are driven by gear 128 which drives pinion 124.

Figure 9:
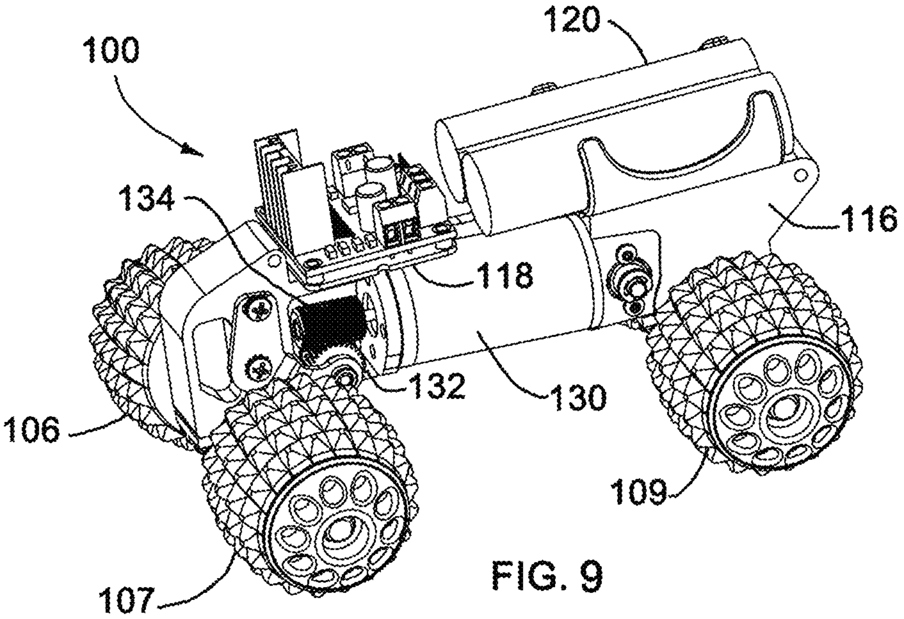
FIG. 9 is an alternate isometric view of the nutating massage device of the first embodiment with the outer casing removed.

FIG. 9 is a front isometric view of the massage device 100 with the outer casing removed and shows the left side of the device 100, which is the side opposite of the gear train shown in FIG. 8. This figure shows the position of the drive motor 130. A worm pinion 134 is attached to the motor drive shaft and rotates worm gear 132. The worm gear 132 is attached to the gear 126 (FIG. 8) via a cross shaft (not shown), such that the motor 130 drives the gear train shown in FIG. 8 while the trigger button 112 is compressed.

Figure 10A:
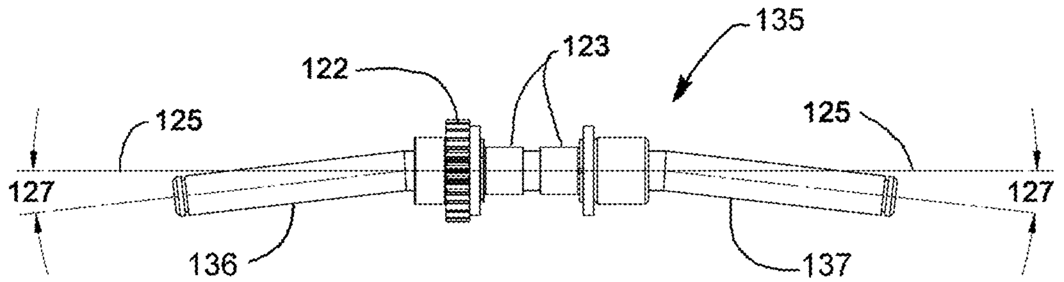
FIG. 10A is a frontal view of one nutating axle of the first embodiment showing the nutation angles on the right and left peripheral ends of the axle.

FIG. 10A shows a view of the front nutating axle assembly 135. The axle rotates within bearings 123 about axis 125, as driven by pinion 122 which is fixedly attached to the axle assembly 135 which possesses two axle extensions 136 and 137. Both axle extensions 136 and 137 are bent at an angle 127 which is called the nutating angle. The left and right nutating angles 127 are shown to be equal in a preferred embodiment of axle 136, but the invention may be implemented with unequal nutating angles. The term nutation is derived from the fact that the peripheral extremities (tips) of axle 135 will rotate within two parallel circular orbits as the axle assembly 135 rotates about axis 125.

Figure 10B:
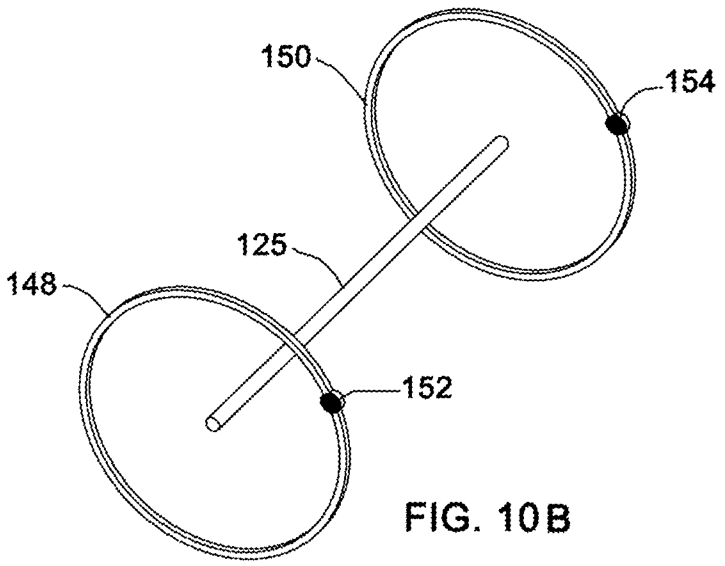
FIG. 10B is diagram explaining the phase relationship between the right and left nutating axle tips according to the axle configuration of FIG. 10A.

FIG. 10B is a diagram explaining the phase relationship between the right and left nutating axle tips according to the axle configuration of FIG. 10A. The wire 125 represents the rotational axis of the axle as shown in in FIG. 10A, while the circles 148 and 150 represent the circular paths (exaggerated) of the axle tip extremities. Nutation circle 148 represents the loci of the path of the right nutating axle tip orbit, while nutating circle 150 represents the orbital path of the left nutating axle tip. Label 152 indicates the position of the right axle tip along its nutation circle at any given point in time, while 154 represents that of the left axle tip. In the example of FIG. 10B, the right axle tip 152 is at its 2 o'clock position while the left axle tip 154 is also it its 2 o'clock position. The rotation of the two axle tips is said to be "in phase" because they both reside at identical angular orientations along their nutation circles at any given instant in time.

A rear nutating axle assembly 151 (not shown isolated) is configured identically as the front nutating axle 135 as shown in FIG. 10A. The right angular extension on the rear axle is designated 138 and the left angular rear axle extension is designated as 167.

Figure 11:
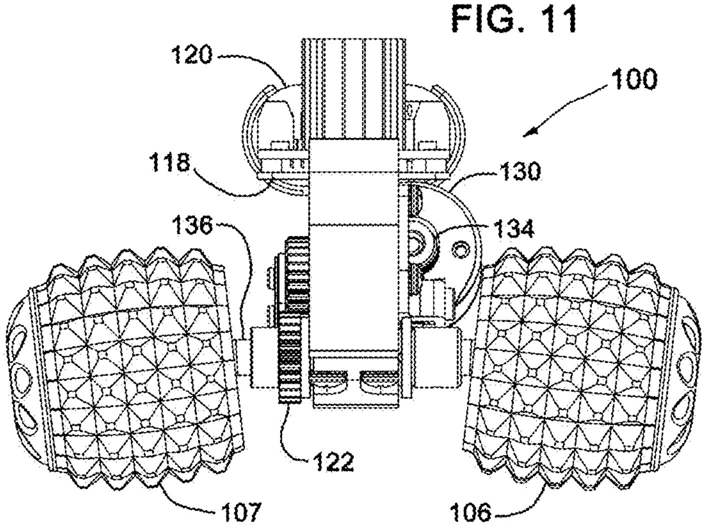
FIG. 11 is a frontal view of the nutating massage device of the first embodiment with the outer casing removed.
Figure 12:
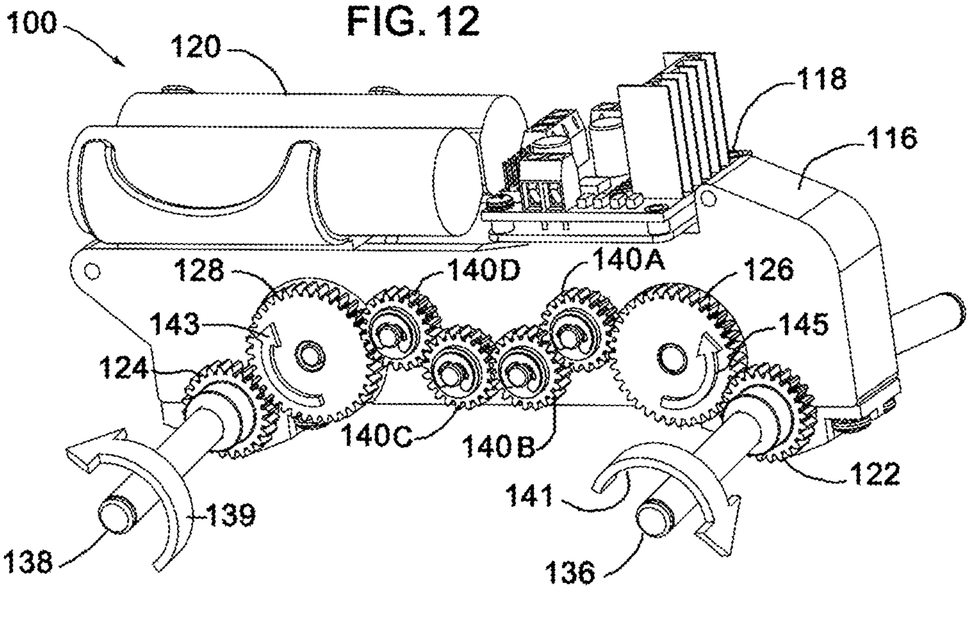
FIG. 12 is a right side isometric view of the nutating massage device of the first embodiment with the massage rollers removed and without the outer casing.

FIG. 11 is a front view of the massage device of the first embodiment 100 with the outer casing removed. The front nutating rollers 107 and 106 are shown mounted upon the front nutating axle assembly 135 to illustrate the roller orientation when the front nutating axle is rotated to the position correlated to its extreme downward inclination. FIG. 12 is a front isometric view of the massage device 100 with the outer casing removed in order to show the driving arrangement of the gears and axles which are attached to the main frame 116. Front axle drive gear 126 is rotating counterclockwise as shown by arrow 145. Pinion 122 therefore causes the tip of nutating axle extension 136 to rotate clockwise as shown by arrow 141. Four synchronizing pinions are shown as 140A, 140B, 140C and 140D. These synchronizing pinions induce rear axle drive gear 128 to rotate clockwise as shown by arrow 143. The clockwise rotation of gear 128 as shown by arrow 143 causes the rear axle drive pinion to rotate the tip 138 of the rear nutating axle counter clockwise as shown by arrow 139. The front nutating axle extension 136 and the rear nutating axle extension 138 therefore counter-rotate synchronously at the same velocity as indicated by the arrows 141 and 139. One cycle is defined as one full revolution of pinion 122 and pinon 124. One of ordinary skill understands that a timing belt could be substituted for some of the gear train components for the purpose of providing synchronization.

The nutating motion of the front axle 136 of device 100 is illustrated in FIG. 13. The arrow 141 shows rotation of drive pinion 122 which is fixed to front axle 136. The tip of the front nutating axle 136 is shown in four superimposed positions 136A thru 136D. Using the analogy of a clock, position 136A illustrates the relative position of the axle tip 136 when the axle is positioned at its 6 o'clock position. The position 136B shows the 9 o'clock position, while 136C shows the 12 o'clock position and 136D shows the 3 o'clock position as the tip moves thru a clockwise circle. The left side of the front nutating axle moves simultaneously thru the same circular path, as explained by the orbits shown in FIG. 10B. The right tip motion is said to be "in phase" with the left tip motion because each tip passes thru the same rotational phase of their circles simultaneously during each cycle. For example, each of the two axle tips will arrive at its 12 o'clock position simultaneously as it traverses its nutation circle. The motion of the two nutating extremities of the front axle is similar to the motion of a human swimmer's arms while doing the butterfly stroke. There is a difference however, in that the tips of the nutating axle move synchronously through a perfect circle.

FIG. 14 illustrates the synchronized motion between the front nutating axle 136 and the rear nutating axle 138. At the moment that the front nutating axle 136 is at its 6 o'clock position 136A, the rear nutating axle is at its 6 o'clock position 138A. Likewise, when front nutating axle is at its 12 o'clock position 136C, the rear nutating axle is also at its 12 o'clock position 138C.

Figure 15:
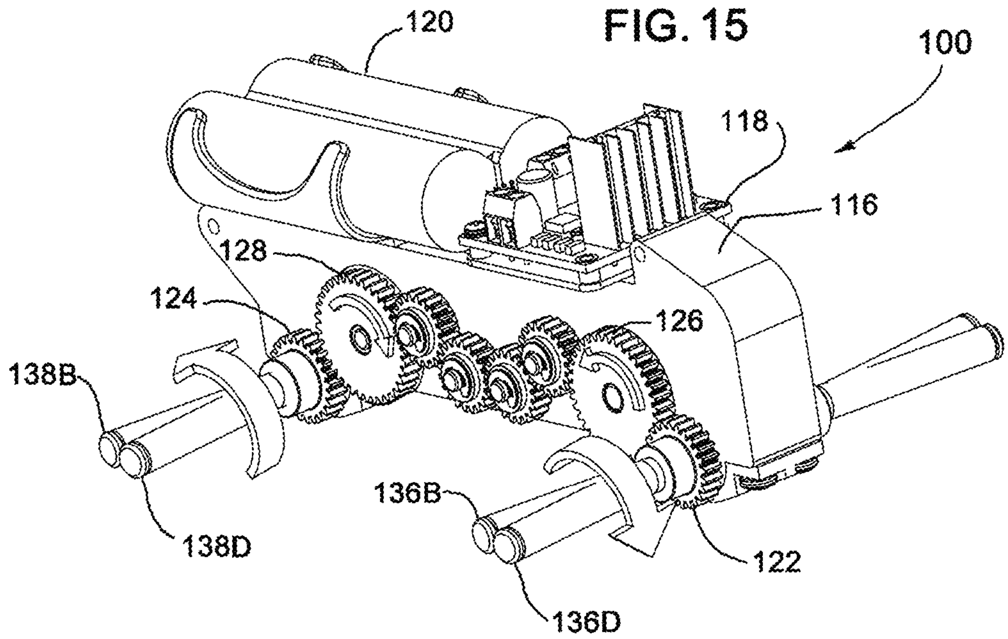
FIG. 15 is an isometric view of the front nutating axle and rear nutating axle of the first embodiment showing the tips of the axles superimposed in two rotational positions designated as 3 o'clock and 9 o'clock.

However, the two nutating axles do not pass thru their 3 o'clock positions simultaneously. FIG. 15 illustrates that the synchronized motion of the two nutating axles induces them to move in opposite directions relative the X axis during a portion a revolution of the two axles. At the moment that the front nutating axle 136 is at its 3 o'clock position 136D, the rear nutating axle is at its 9 o'clock position 138B. The two axle tips have thus moved apart at that position in the cycle. Likewise, when the front nutating axle is at its 9 o'clock position 136B, the rear nutating axle is at its 3 o'clock position 138D. The two axle tips have thus moved closer together relative to the X-axis at that position in the cycle.

Figure 16A:
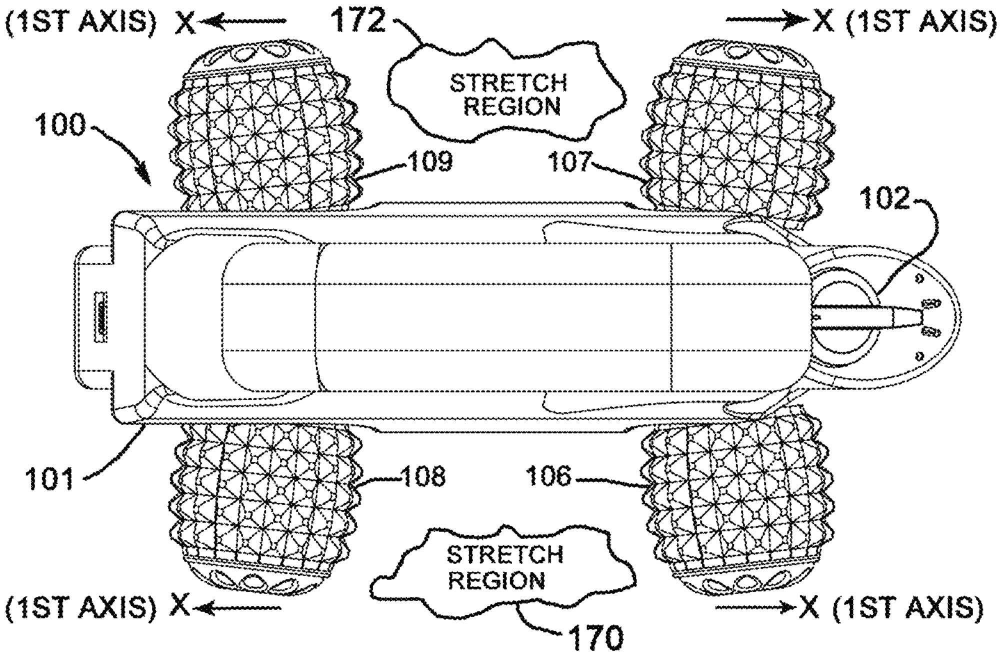
FIG. 16A is a top view of the massage device of the first embodiment showing the front rollers having moved apart from the rear rollers along the X-axis.

FIG. 16A is a top view of the massage device 100 showing the front and rear nutating rollers at their relative extreme positions along the x-axis within the nutating cycle. The front nutating roller 106 is at its 3 o'clock position while the rear nutating roller 108 is at its 9 o'clock position. Likewise, the left front roller 107 is ats 3 o'clock position while the left rear nutating roller 109 is at its 9 o'clock position. The positions of the two nutating rollers correspond to the positions 136D and 138B as shown in FIG. 15.

The label "STRETCH" in FIG. 16A is used to indicate that a massage-receiving fascia within the region 172 between the roller 109 and 107 tends to be stretched by the opposing separating movement of those two rollers along the X-axis. The fascia region 170 between nutating roller 106 and nutating roller 108 is also synchronously stretched. As explained in reference to FIG. 6, the X-axis corresponds to one "stretch axis" along the surface of the fascia.

Figure 16B:
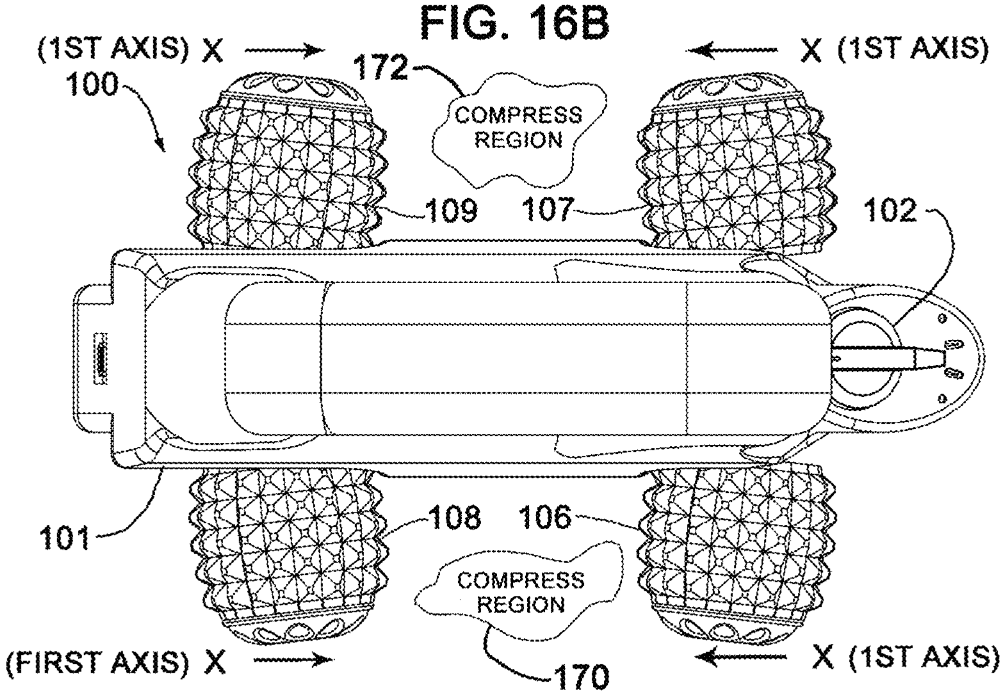
FIG. 16B is a top view of the massage device of the first embodiment showing the front rollers and rear rollers having moved closer to each other along the X-axis.

In comparison to FIG. 16A, FIG. 16B is a top view of the massage device 100 showing the front and rear nutating rollers at their opposite relative extreme positions along the X-axis within the nutating cycle. In FIG. 16B the two nutating rollers have rotated 180 degrees from the positions shown in FIG. 16A. FIG. 16B illustrates the condition where the two right rollers 106 and 108 are closest together along the stretch axis (X-axis). The same is true for the left rollers 107 and 109.

The label "COMPRESS" in FIG. 16B is used to indicate that the massage-receiving fascia within the region 172 between the roller 109 and 107 tends to be compressed as those two rollers move toward each other along the X-axis. The region 170 between nutating roller 106 and nutating roller 108 is also synchronously compressed. In one revolution of the synchronized nutating axles (one cycle), the fascia regions 170 and 172 between the front nutating rollers and the rear nutating rollers experiences a bidirectional cycle of stretch and compression along the X-axis.

Figure 17A:
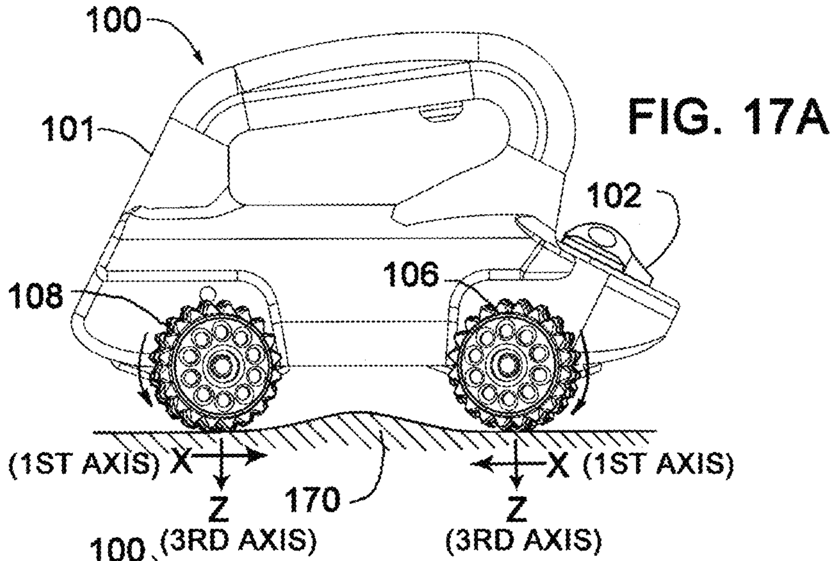
FIG. 17A is a side elevational view of the massage device showing the compressed fascia region between the rollers.
Figure 17B:
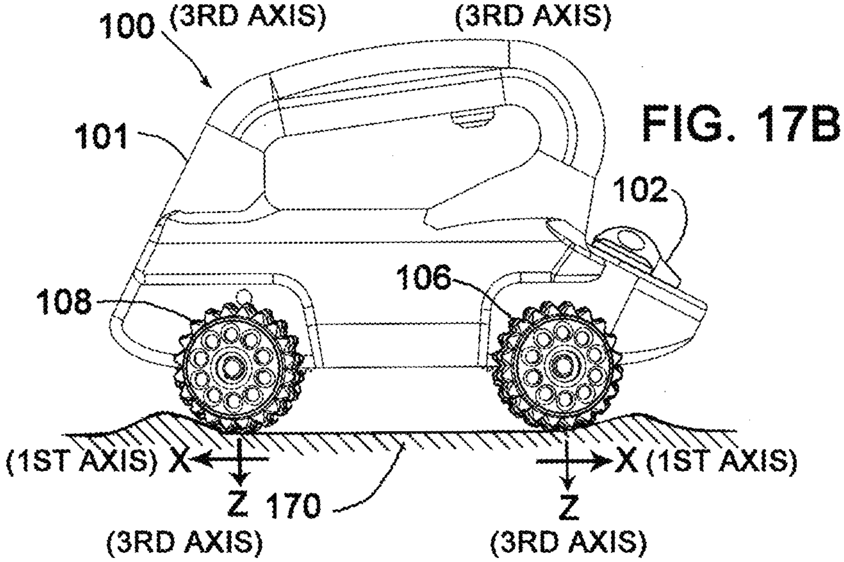
FIG. 17B is a side elevational view of the massage device showing the stretched fascia region between the rollers.

The side elevational view in FIG. 17A is helpful to understand the configuration of the compressed fascia as explained in the top view of FIG. 16B. Compression along the plane of the fascia creates a bulge as shown in region 170 of FIG. 17A. As the rollers 108 and 106 separate and move in the opposite direction, the region 170 is stretched as shown in FIG. 17B. The side view of FIG. 17B thus corresponds to the top view shown in FIG. 16A.

Figure 17C:
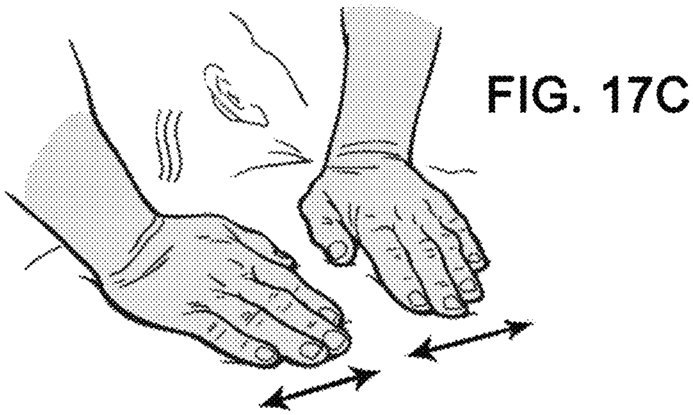
FIG. 17C is an illustration of the hands of a massage therapist using a myofascial massage technique.

FIG. 17C illustrates the hands of a massage therapist while performing a technique called myofascial massage. The fascial region of the subject between the two hands of the therapist is alternately compressed and stretched as the movement is performed. The same alternating compression and stretching cycle is simulated by the eccentric rollers of the massage device disclosed herein as shown in FIG. 17A and FIG. 17B.

FIG. 18, FIG. 19, FIG. 20, FIG. 21 and FIG. 22 illustrate a side view of the massage device 100 as the right front roller 106 and right rear roller 108 rotate through the circular sequence of positions comprising one revolution of their synchronized nutating axles.

Figure 18:
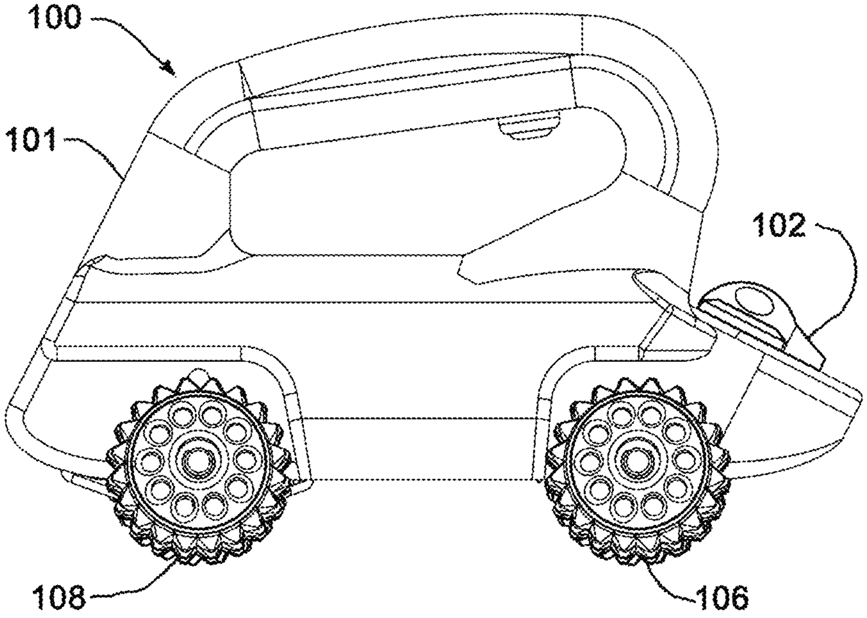
FIG. 18 is a right side view of the massage device of the first embodiment showing the right front roller and right rear roller located at the 12 o'clock position.
Figure 19:
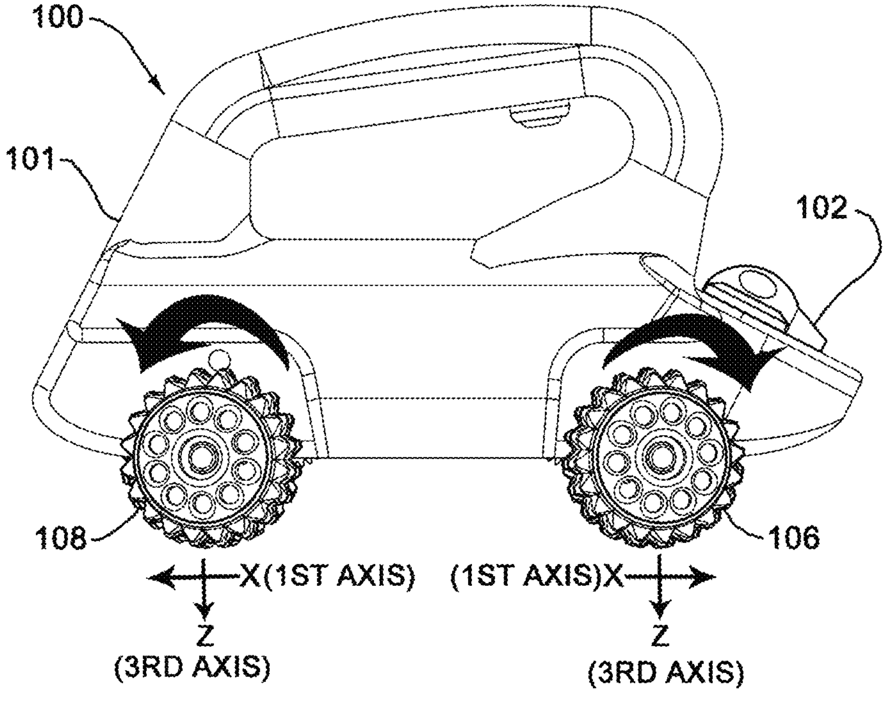
FIG. 19 is a right side view of the massage device of the first embodiment showing the right front roller having moved to the 3 o'clock positions and right rear roller having moved to the 9 o'clock position.

Specifically, FIG. 18 illustrates the positions of rear roller 108 and front roller 106 as they both reside in the 12 o'clock orientation along the circular orbit that was described in FIG. 10B. In FIG. 19, the right front roller 106 has moved from its 12 o'clock position to its 3 o'clock position, inducing a massage force vector along the X-axis and a massage force vector along the Z-axis. The right rear roller 108 has moved from its 12 o'clock position to its 9 o'clock position, inducing a massage force vector along the X-axis and a massage force vector along the Z-axis. The arrows indicate the rotational directions of the two counter rotating axle tips.

In FIG. 20, the right front roller 106 has moved from its 3 o'clock position to its 6 o'clock position, inducing a massage force vector along the X-axis and a massage force vector along the Z-axis. The right rear roller 108 has moved from its 9 o'clock position to its 6 o'clock position, inducing an opposite massage force vector along the X-axis and a massage force vector along the Z-axis. The arrows again indicate the rotational directions of the two counter rotating axle tips.

FIG. 21 illustrates the stage wherein the right front roller 106 has moved from its 6 o'clock position to its 9 o'clock position, inducing a massage force vector along the X-axis and a massage force vector along the Z-axis. The right rear roller 108 has moved from its 6 o'clock position to its 3 o'clock position, inducing a massage force vector along the X-axis and a massage force vector along the Z-axis. The arrows again indicate the rotational directions of the two counter rotating axle tips.

Figure 22:
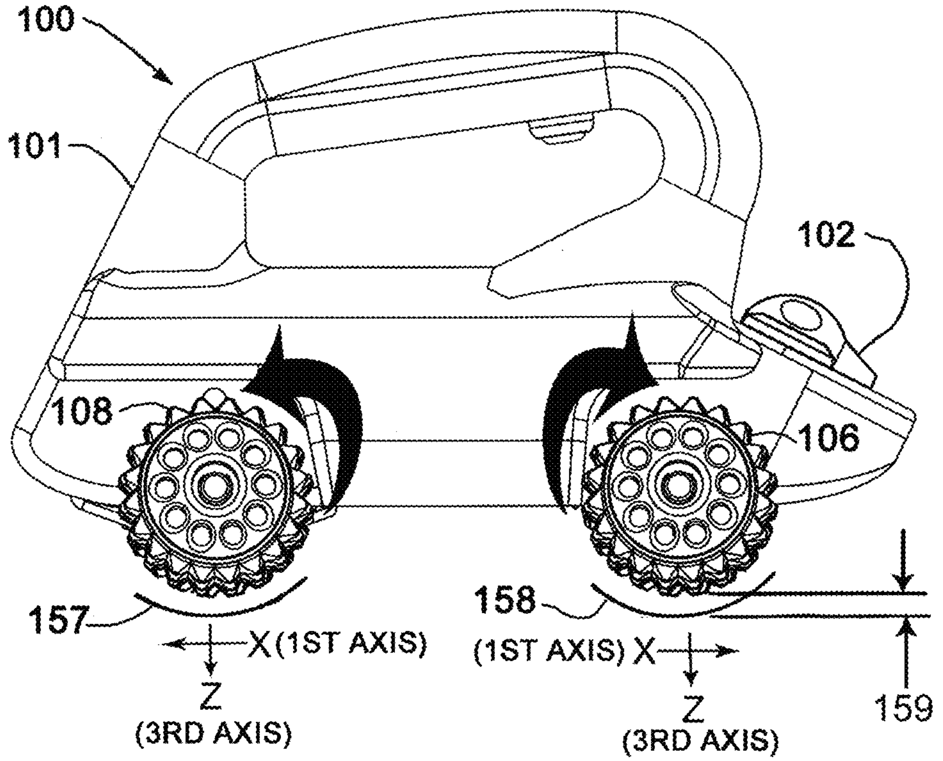
FIG. 22 is a right side view of the massage device of the first embodiment showing the right front roller having moved to the 12 o'clock position and right rear roller having moved to the 12 o'clock position.

FIG. 22 illustrates the stage wherein the right front roller 106 has moved from its 9 o'clock position to its 12 o'clock position, inducing a massage force vector along the X-axis and a massage force vector along the Z-axis. The right rear roller 108 has moved from its 3 o'clock position to its 12 o'clock position, inducing an opposite massage force vector along the X-axis and a massage force vector along the Z-axis. The arrows again indicate the rotational directions of the two counter rotating axle tips.

The rollers 106 and 108 are shown in their 12 o'clock position in FIG. 22. The two arcs 158 and 159 in FIG. 22 represent the extreme lower periphery of rollers 106 and 108 when located at their 6 o'clock position. The dimension 159 thus represents the range of motion traversed by these rollers as projected upon the Z-axis, which creates the percussive force component of the nutating massage device.

Figure 23:
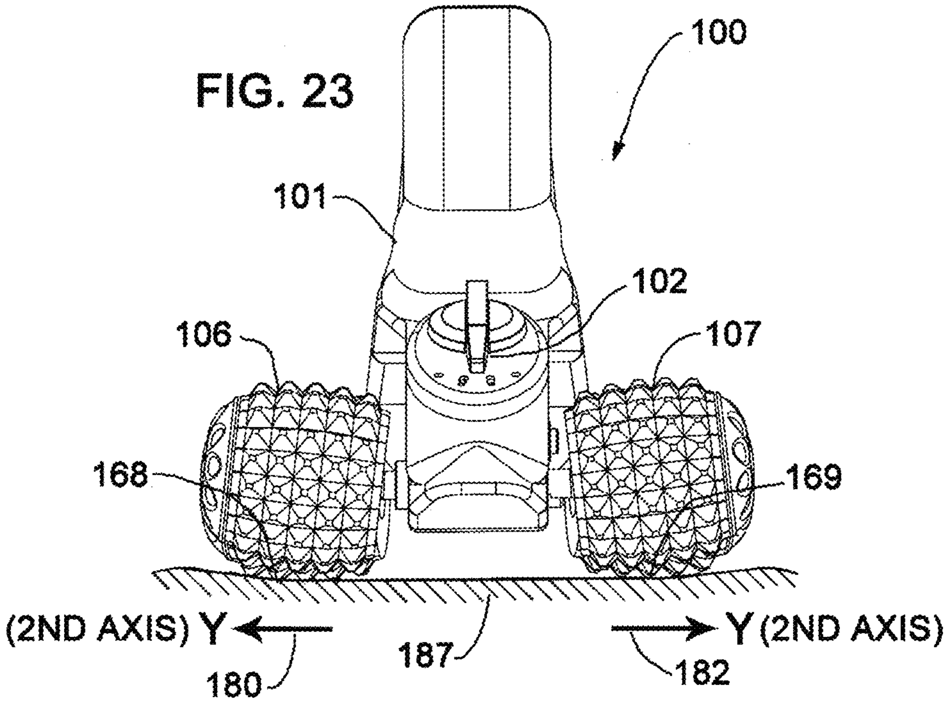
FIG. 23 is a frontal view of the massage device of the first embodiment showing the contact regions of the left front roller and the right front roller having moved apart along the Y-axis.

The nutating axle motion additionally creates massage force vectors along the Y-axis (as shown at least within FIG. 6). FIG. 23 is a front view of the massage device 100 showing the two front nutating rollers. This figure illustrates the massage force vectors 180 and 182 being created in the regions 168 and 169 beneath the rollers and orthogonal to the X-axis, as the two front nutating rollers 106 and 107 move toward the 12 o'clock zeniths along their nutating circle orbit. The opposing outward motions in directions 180 and 182 cause the fascia region 187 to stretch along the Y-axis.

FIG. 24 is a front view of the massage device showing the two front nutating rollers and illustrates the massage force vectors 181 and 183 being created in the contact regions 168 and 169 along the Y-axis, as the two front nutating rollers 106 and 107 move toward the lowest 6 o'clock position along the nutating circle orbit. The opposing inward motions in directions 181 and 183 cause the fascia region 187 to compress along the Y-axis. One rotational cycle of each nutating roller thus produces bidirectional massage force vectors outward (180 and 182) and then inward (181 and 183) along the Y-axis.

Thus, 3-dimensional massage forces are created along the X, Y, and Z-axes under the contact region of each of the four rollers during one revolution (one cycle) of the two synchronized nutating axle assemblies 135 and 151. Each fascia contact region 168 and 169 thus experiences a bidirectional reciprocating pulsation along each of the X, Y and Z orthogonal axes during each cycle. These reciprocating forces are imposed whether or not the device is traversed along the massage-receiving fascia surface.

FIG. 17A and FIG. 17B illustrate the reciprocating stretching and compression of the fascia along the X-axis. FIG. 23 and FIG. 24 illustrate the reciprocating stretching and compression of the fascia along the Y-axis. FIG. 22 illustrates the range of reciprocating percussive motion upon the fascia along the Z-axis. Collectively, these figures illustrate how the nutating massage device uniquely induces reciprocating massage forces along all three axes X, Y and Z.

A second embodiment of a nutating massage device is shown in FIG. 25. Massage device 200 includes two massage rollers which are rotatably mounted on nutating axles and two rollers which are mounted on a non-nutating axle. The device 200 consists of a casing body 201 which includes a handle portion 204. The front rollers 206 and 207 are driven by a first nutating axle (the front axle) and the rear rollers 208 and 209 (not shown) are freely rotatable on a non-nutating rear axle which is fixedly attached to the device frame. The speed of the nutating axle motion is controlled by the velocity of a drive motor mounted internally within the casing 201. The operator controls the motor speed by setting the position of the speed control knob 202. The reference axes X, Y, and Z are shown to orient the vectors showing direction of the massage forces as further explained below. In general, the operator grasps the device by the handle portion 204 and exerts pressure along the negative Z axis. The user may traverse the massage device back and forth along the massage-receiving surface in the direction of the X axis, or hold the device in a stationary position at a specific target region.

Figure 26:
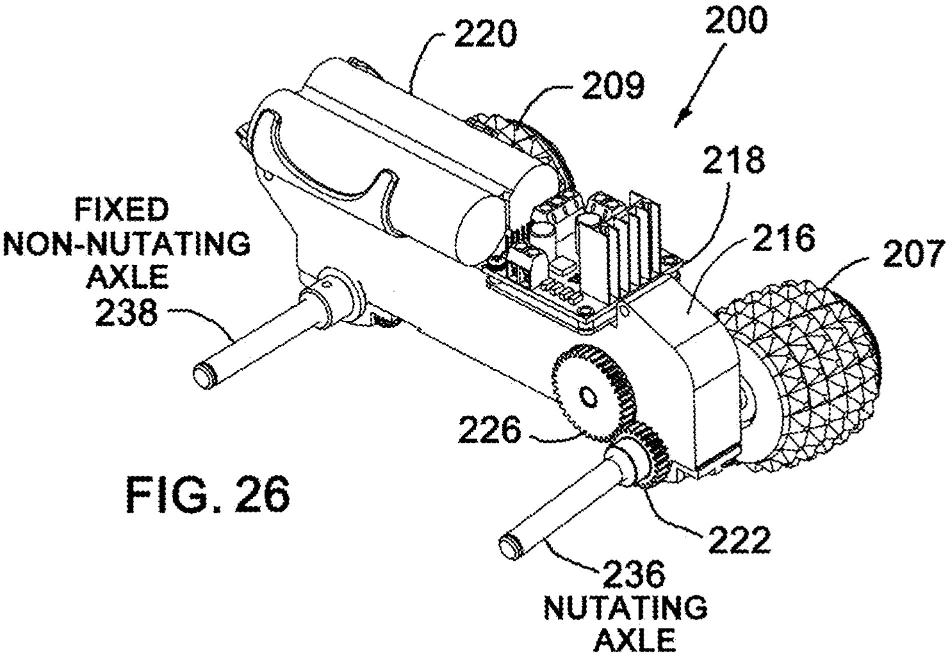
FIG. 26 is an isometric view of a second embodiment of the nutating massage device with the outer casing removed and the right rollers removed to expose the axles.

The second embodiment massage device 200 is a variation of the first embodiment with a lessor manufacturing cost and longer battery life arising from the elimination of some drive components. Only one of two axles are motor-driven. The massage device 200 is shown in FIG. 26 where the outer casing is removed to illustrate the components attached to main frame 216. The electronics 218 for the motor control and charging circuitry are mounted just in front of the batteries 220 that power the motor. The batteries could be of the NICAD, lithium ion, sodium ion or other known battery types. The trigger button and charging port (not shown) are identical to those explained in the first embodiment (FIG. 7). The front nutating axle 236 is driven from gear 226 via pinion 222. A drive motor and worm gears (not shown) are mounted upon the left side of main frame 216, and rotate the drive gear 226. Rear axle 238 is a non-nutating shaft which is fixedly attached to main frame 216. The non-nutating fixed axle 238 may have the same angular bend portions as the nutating axle, or may have no bends.

When the massage device 200 is activated by its trigger button, the drive motor rotates the front nutating axle 236, creating the nutating rotation of the front massage rollers. The rear massage roller pair freely rotates upon fixed axle 238 and provides stability for the device in the application whereupon the device is traversed along the massage-receiving surface. As explained in the disclosure of the first embodiment, the two front nutating rollers each induce a 3-dimensional massage force vector in the contact region directly beneath each roller. The role of the axles in the second embodiment may be reversed, such that the rear rollers nutate and the front rollers may be fixedly attached to provide stabilization.

Figure 27:
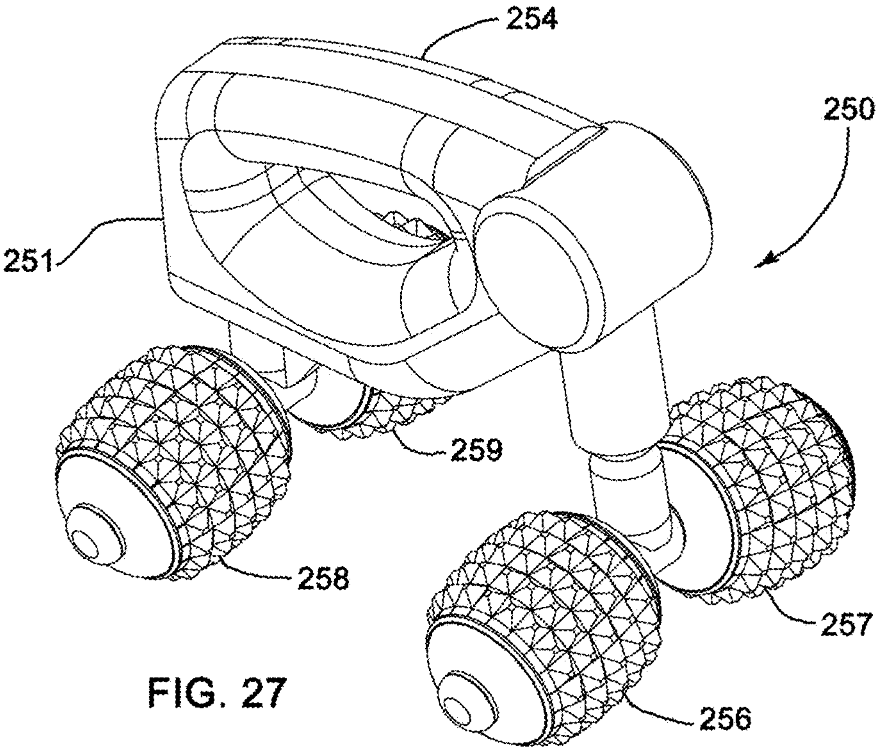
FIG. 27 is an isometric view of a third embodiment of the nutating massage device with a simplified outer casing.

A third embodiment of a nutating massage device 250 is shown in FIG. 27. This embodiment is designed as a lower manufacturing cost alternative to the second embodiment, where only one nutating axle is driven, thus eliminating the manufacturing costs of the synchronizing gear train components. Additionally, the third embodiment eliminates the speed control means and it accompanying circuitry, thus further reducing manufacturing cost. This embodiment operates at a fixed motor speed, so that its housing can be made slimmer and more compact than the configuration of the first embodiment.

The nutating massage device 250 in FIG. 27 possesses a slimmer housing 251 with a handle portion 254, but is devoid of any user-adjustable speed control. The rear rollers 258 and 259 are mounted on nutating axles which are motor-driven in the same way as explained in the first embodiment. Front rollers 256 and 257 are mounted on a fixed axle 136 as shown in FIG. 10*a* which does not rotate. Rollers 256 and 257 rotate freely upon axle 136 to provide stability during traversing motion of device 250.

Figure 28:
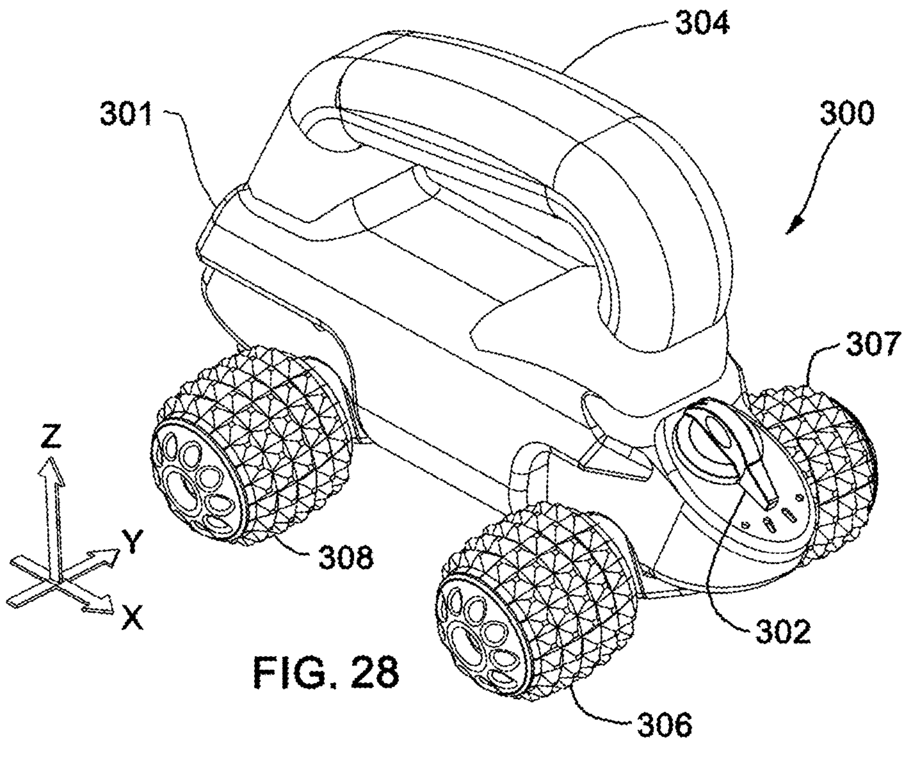
FIG. 28 is an isometric view of a fourth embodiment of the nutating massage device.

A fourth embodiment of a nutating massage device 300 is shown in FIG. 28. Massage device 300 includes four massage rollers which are rotatably mounted on two nutating axles. The device 300 consists of a casing body 301 which includes a handle portion 304. The front rollers 306 and 307 are driven by a first nutating axle (the front axle) and the rear rollers 308 and 309 (not shown) are driven by a second nutating axle (the rear axle) The speed of the nutating axle motion is controlled by the velocity of a drive motor mounted internally within the casing 301, and the operator controls the motor speed by setting the position of the speed control knob 302. The reference axes X, Y, and Z are shown to orient the vectors showing direction of the massage forces as further explained below. In general, the operator grasps the device by the handle portion 304 and exerts pressure along the negative Z axis. The user may traverse the massage device back and forth along the massage-receiving surface in the direction of the X axis, or the user may hold the device stationary against a specific target region.

Figure 29A:
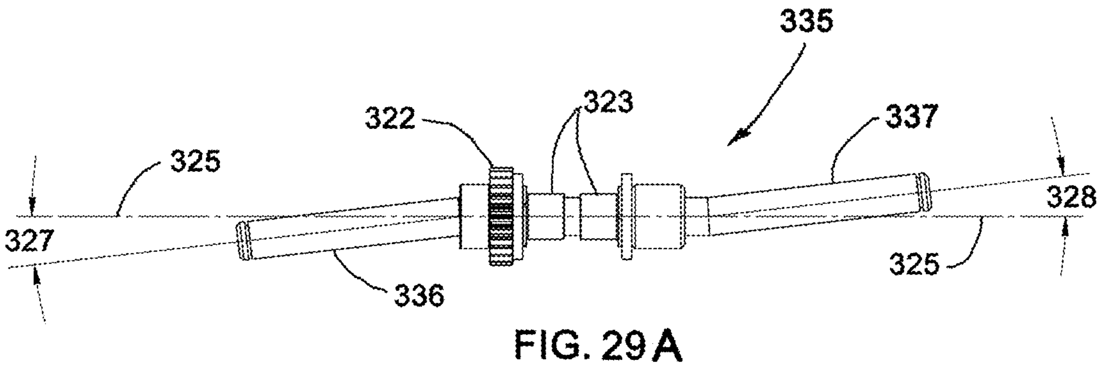
FIG. 29A is a view of one nutating axle of the fourth embodiment showing the opposing nutation angles on the right and left peripheral ends of the axle.

The configuration of the nutating axles used in the fourth embodiment is different than the nutating axles used in the first, second and third embodiments. FIG. 29A shows the configuration of the front nutating axle assembly 335 which is used in the fourth embodiment. The axle rotates within bearings 323 about axis 325, as driven by pinion 322 which is fixedly attached to the axle assembly 335. The left angular axle extension 336 is bent at an angle 327 which is called the nutating angle. The right angular axle extension 337 is bent into a nutating angle 328 which is in the opposite angular direction as the left axle extension. The left and right nutating angles 327 and 328 are shown to be equal in a preferred embodiment of axle assembly 335, but this embodiment may be implemented with unequal nutating angles.

Figure 29B:
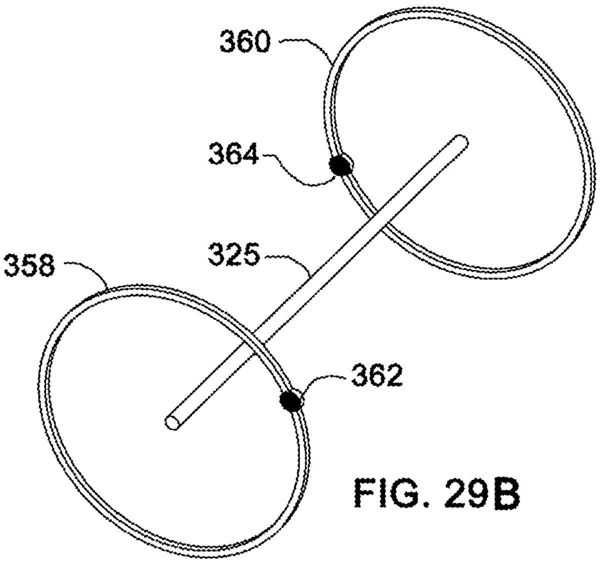
FIG. 29B is diagram explaining the phase relationship between the right and left nutating axle tips according to the axle configuration of FIG. 29A.

FIG. 29B is a diagram explaining the phase relationship between the right and left nutating axle tips according to the axle configuration of FIG. 29A. The wire 325 represents the rotational axis of the axle as shown in in FIG. 29A, while the circles 358 and 360 represent the circular paths (exaggerated) of the axle tip extremities. Nutation circle 358 represents the loci of the path of the right nutating axle tip orbit, while nutating circle 360 represents the orbital path of the left nutating axle tip. Label 362 indicates the position of the right axle tip along its nutation circle at any given point in time, while 364 represents that of the left axle tip. In this example, the right axle tip 362 is at its 2 o'clock position while the left axle tip 364 is also it its 8 o'clock position. In the analogy of a clock, axle tip 364 is 6 hours ahead (180 degrees) of axle tip 362. The angular relationship between the two axle tips is said to be "180 degrees out of phase" because one axle tip remains 180 degrees away from the other along their nutation circles at any given instant in time. At the moment in time when one axle tip is at 3 o'clock, the other axle tip is at its 9 o'clock position.

The nutation circles 358 and 360 formed by the left tip and right tip will be aligned when looking along the rotation axis 325 of axle assembly 335. However, the angular phase of the axle tips along the nutation circles will be out of phase by 180 degrees. The overall motion of the front nutating axle can be envisioned as similar to the motion of a human swimmer doing the overarm freestyle, as one arm rotates forward while the opposite arm rotates rearward. There is a difference however in that the tips of the nutating axle move through a perfect circle.

Figure 30:
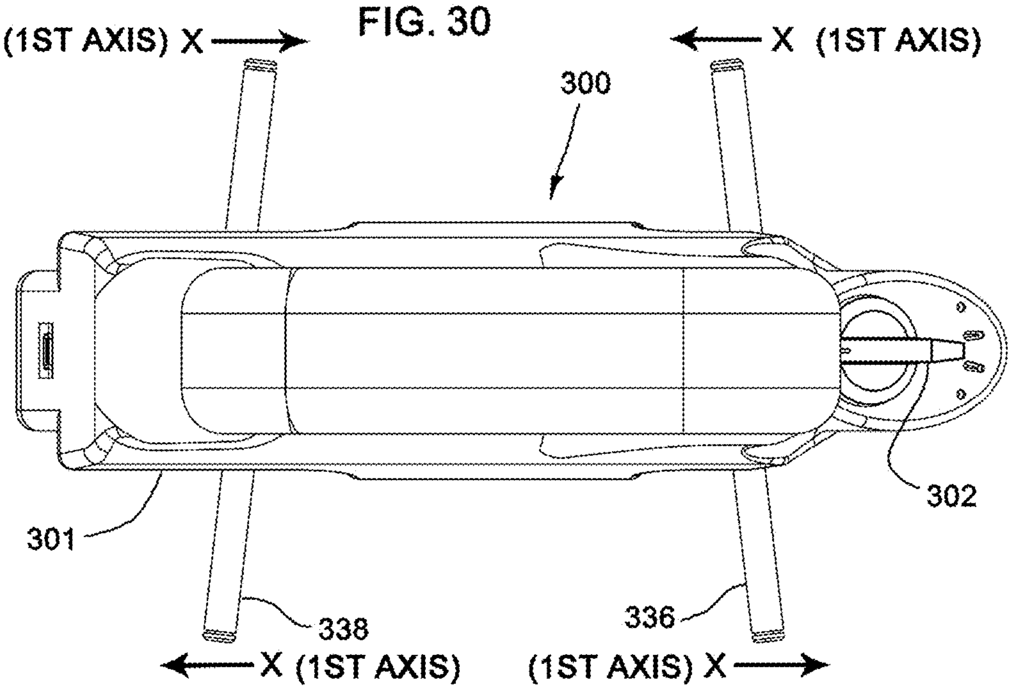
FIG. 30 is a top view of the fourth embodiment with the massage rollers removed to show the axle tip positions at their synchronized extremes along the X-axis.

FIG. 30 is a top view of the massage device 300 with the massage rollers removed from the nutating axles. Rear nutating axle assembly 394 (not shown) is identical to the configuration of the front nutating axle 335 which was shown in FIG. 29A. However, the angular orientation of the two axles are set up at assembly to be exactly opposite. Also, the synchronizing gear train from the first embodiment (see FIG. 12) is identically utilized in this fourth embodiment. In this way, the rotational velocities of the front and rear nutating axles are identical and their motion is synchronized.

In the illustration of FIG. 30, the right extension 336 of nutating axle assembly 335 is located at its 3 o'clock position and synchronized with the right extension 338 of the rear nutating axle when located at its 9 o'clock position. The result is that the left extension 336 of nutating axle 335 is simultaneously located at its 9 o'clock position when viewing the front axle from the right side. Similarly, the right extension of the rear axle 338 is 180 degrees out of phase with the right tip of that axle. When viewed from above, the X-axis vector arrows indicate that the right axle extensions have just moved away from each other as the left axle extensions have just moved toward each other.

Figure 31:
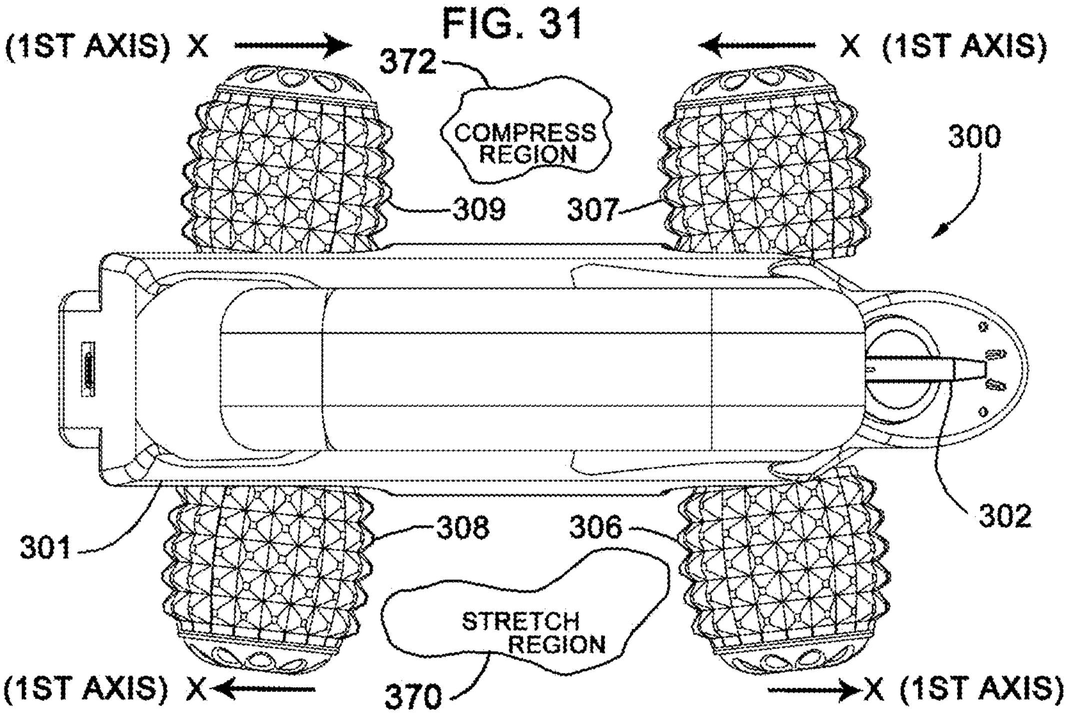
FIG. 31 is the same top view of the fourth embodiment as shown in FIG. 30 with the massage rollers shown at their synchronized extremes along the X-axis.

FIG. 31 is a top view of massage device 300 that is identical to FIG. 30, with the exception that the freely rotatable nutating rollers are installed on the nutating axles. Right front roller 306 is located in its 3 o'clock position and synchronized with the right rear nutating roller 308 when located at its 9 o'clock position. At this point in the nutating cycle those two rollers have reached their extreme distance from each other, and have induced a stretching force along the stretching axis in the fascia region 370 between roller 308 and roller 306.

Simultaneously, the left rear roller 309 and the left front roller 307 have reached the position in the nutation cycle where they are closest to each other along the X-axis. The symbol "COMPRESS" in FIG. 31 indicates that the fascia region 372 between roller 307 and roller 309 tends to become compressed as those two rollers move towards each other.

During the successive portion of each cycle, the relative motion of the left and right rollers along the X-axis is reversed as shown in FIG. 32 which shows a top view of the massage device 300. The position of the two nutating axles is rotated by 180 degrees when compared to FIG. 31, such that front right roller 306 is located at its 9 o'clock position and right rear roller 308 is located at its 3 o'clock position. At this point in the nutating cycle, roller 306 has moved closest to roller 308 along the X-axis. Simultaneously, the left side rollers 307 and 309 are 180 degrees out of phase, and those two rollers have moved to a position with the most separation from each other.

FIG. 31 and FIG. 32 together explain that the stretching and compression cycles along the surface of the fascia are alternatingly reversed from side to side of the device in the fourth embodiment of the nutating massage device 300. These figures can be compared to FIG. 16A and FIG. 16B of the first embodiment. In that first embodiment, the stretching and compression cycles induced by the left and right roller pairs did not alternately reverse from side to side.

FIG. 33 illustrates a fifth embodiment of a nutating massage device designated as device 400. Massage device 400 includes two massage rollers which are rotatably mounted on one nutating axle and two rollers which are mounted on one non-nutating axle. The device 400 consists of a casing body 401 which includes a handle portion 404. The front rollers 406 and 407 are driven by a first nutating axle (the front axle) and the rear rollers 408 and 409 (not shown) are freely rotatable on a fixed rear axle which is not rotatable. The speed of the nutating axle motion is controlled by the velocity of a drive motor mounted internally within the casing 401, and the operator controls the motor speed by setting the position of the speed control knob 402. The reference axes X, Y, and Z are shown to orient the vectors showing direction of the massage forces as further explained below. In general, the operator grasps the device by the handle portion 404 and exerts pressure along the negative Z axis. The user may traverse the massage device back and forth along the massage-receiving surface in the direction of the X axis, or the user may hold the device stationary against a specific target region.

Figure 34:
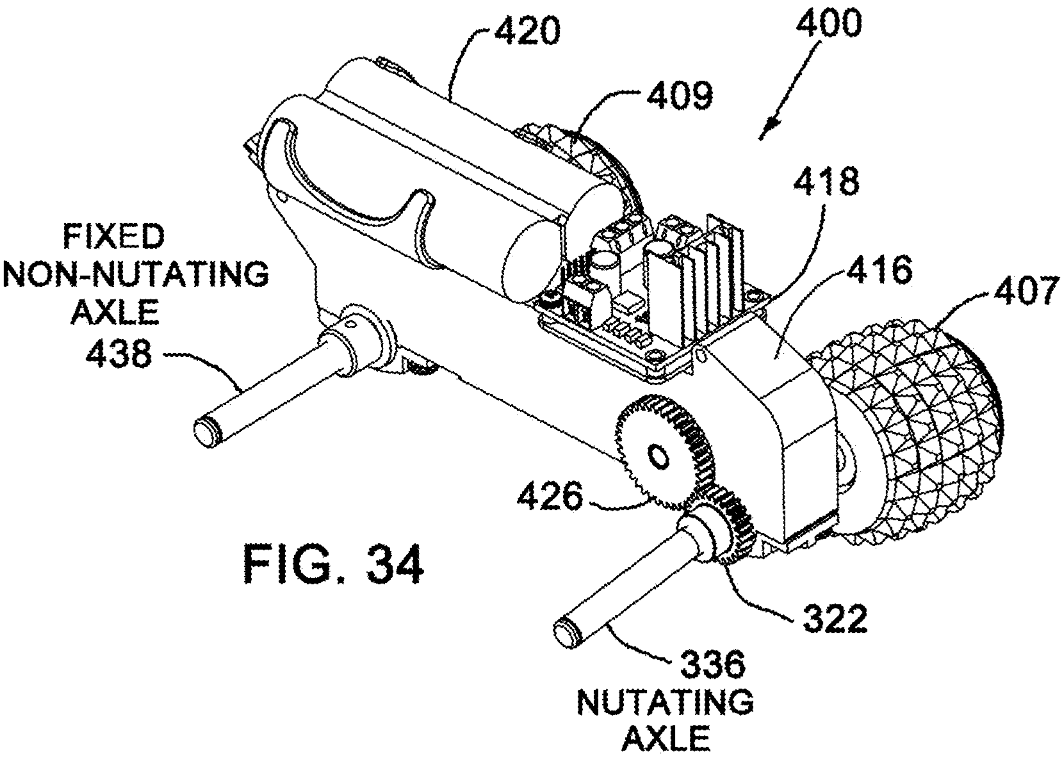
FIG. 34 is an isometric view of a fifth embodiment of the nutating massage device with the outer casing removed to show the interior drive components.

The massage device 400 is shown in FIG. 34 where the outer casing is removed to illustrate the components attached to main frame 416. The electronics 418 for the motor control and charging circuitry are mounted just in front of the batteries 420 that power the motor. The batteries could be of the NICAD, lithium ion, sodium ion or other known battery types. The trigger button and charging port (not shown) are identical to those explained in the first embodiment (FIG. 7). The front nutating axle assembly 335 is identical to that shown in FIG. 29A, and is driven from gear 426 via pinion 322. A drive motor and worm gears (not shown) are mounted upon the left side of main frame 416, and rotate the drive gear 426. Rear axle 438 is a non-rotatable shaft which is fixedly attached to main frame 416.

When massage device 400 is activated by its trigger button, the drive motor rotates the front nutating axle assembly 335, creating the nutating rotation of the front massage rollers 406 and 407 which rotate 180 degrees out of phase. The rear massage rollers 408 and 409 freely rotate upon fixed axle 438 and provide stability for the device in the application whereupon the device is traversed along the massage-receiving surface. As explained in the disclosure of the first embodiment, the two front nutating rollers each induce a 3-dimensional massage force vector in the contact region directly beneath each roller. The role of the axles in the fourth embodiment may be reversed, such that the rear rollers nutate and the front rollers are utilized for stabilization.

Variations of these embodiments may be apparent to one of ordinary skill. A second drive motor could be utilized in the first and fourth embodiments such that the synchronizing gears 140A, 140B, 140C and 140D could be eliminated. In that variant, the electronic controller is utilized to synchronize the phase of each motor, such that the same 3-dimensional massage force vectors are induced as were explained in the first and fourth embodiments.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A handheld, self-powered freely traversable massage device having a first non-traversing mode and a second traversing mode, the device comprising:

a casing including a handle portion;

a rechargeable battery pack;

one motor located within the casing;

an operator-adjustable motor speed control mechanism;

an operator controlled activation switch;

four rollers, each roller comprising an axle and each roller configured to rotate freely upon its own axle, the four rollers defining a front roller pair and a rear roller pair;

the front roller pair is comprised of a first roller and a second roller, the rear roller pair is comprised of a third roller and a fourth roller;

the first roller and the third roller are oriented external to the casing on a right peripheral side of the casing, the first and third rollers defining a right roller pair;

the second roller and the fourth roller are oriented external to the casing on a left peripheral side of the casing, the second and fourth rollers defining a left roller pair;

the axle of the first roller and the axle of the second roller rigidly adjoined at opposing ends of a first motor-driven axle and extending angularly therefrom, causing the axles of the first and second rollers to be configured to orbit conically about the first motor-driven axle;

the axle of the third roller and the axle of the fourth roller rigidly adjoined at the opposing ends of a second motor-driven axle and extending angularly therefrom, causing the axles of the third and fourth rollers to be configured to orbit conically about the second motor-driven axle;

the conical orbits of the front roller axles and the conical orbits of the rear roller axles configured to cause the front roller pair and the rear roller pair each to synchronously nutate about their respective motor-driven axle as the motor continuously rotates;

each roller axle orbit comprising a 360 degree excursion along a nutation circle formed by loci of a distal end of each roller axle, an axis of each nutation circle being coincident with a rotation axis of its corresponding motor-driven axle;

each roller having an outer surface configured to be in continuous rolling contact with an independent area of the fascia during each roller axle orbit while the device is positioned stationary in the first non-traversing mode;

the right roller pair configured to bear upon a first fascia region comprising a region of the fascia between the right roller pair;

the left roller pair configured to bear upon a second fascia region comprising a region of the fascia between the left roller pair;

the motor-driven axles being angularly phased such that a center distance between the right roller pair and a center distance between the left roller pair each expand and contract cyclically as the motor continuously rotates;

the expanding and contracting center distance between each roller pair producing continuously reciprocating roller oscillation configured to bear upon the first and the second fascia regions;

each roller producing one reciprocation cycle in each of three directions axes during each nutation orbit, including:

1) a first reciprocation axis upon a first plane being parallel to a fascia surface and directed along the first plane perpendicular to its motor-driven axle axis, and 2) a second reciprocation axis upon a second plane being parallel to a fascia surface and directed along the second plane parallel to its motor-driven axle axis;

3) a third reciprocating axis upon a third plane being perpendicular to a fascia surface and directed along the third plane perpendicular to the fascia surface, and the motor configured to continuously produce reciprocating contact upon each of the first fascia region and the second fascia region including percussive forces along the third axis and stretching forces along the first and second axes simultaneously while the device is positioned stationary in the first non-traversing mode;

wherein the continuously reciprocating roller motion upon the first fascia region is synchronized with the oppositely directed reciprocating roller motion upon the second fascia region while the device is positioned stationary in the first non-traversing mode, and at a rate proportional to an operator-controlled motor speed.

2. The massage device of claim 1, whereupon the axle of the first roller and the axle of the second roller rotate synchronously in phase through identical nutating circles.

3. The massage device of claim 1 whereupon the axle of the third roller and the axle of the fourth roller rotate synchronously in phase through identical nutating circles.

4. The massage device of claim 1 wherein a rotational velocity of the first motor-driven axle is the same as a rotational velocity of the second motor-driven axle.

5. The massage device of claim 1 whereupon the first motor-driven axle and the second motor-driven axle are driven by the same motor.

6. The massage device of claim 1 whereupon synchronizing gears are used to synchronize a rotation of the second motor-driven axle in respect to a rotation of the first motor-driven axle.

7. The message device of claim 1 whereupon the second motor-driven axle synchronously counter-rotates relative to the first motor-driven axle.

8. The massage device of claim 1 whereupon a 3 o'clock position of the first roller is configured to be synchronized to a 9 o'clock position of the fourth roller.

9. The massage device of claim 8 whereupon the expanding center distance between the right roller pair and the expanding center distance between the left roller pair act are configured to induce a stretching force upon the surfaces of the first fascia region and the second fascia region.

10. The massage device of claim 1 whereupon a rotational velocity of the first motor-driven axle is different than a rotational velocity of the second motor-driven axle.

11. A handheld, self-powered freely traversable massage device having a first non-traversing mode and a second traversing mode, the device comprising:

a casing including a handle portion;

a rechargeable battery pack;

one motor located within the casing;

an operator-adjustable motor speed control mechanism;

an operator controlled activation switch;

four rollers, each roller comprising an axle and each roller configured to rotate freely upon its own axle, the four rollers defining a front roller pair and a rear roller pair;

the front roller pair is comprised of a first roller and a second roller, the rear roller pair is comprised of a third roller and a fourth roller;

the first roller and a third roller are oriented external to the casing on a right peripheral side of the casing, the first and third rollers defining a right roller pair;

the second roller and a fourth roller are oriented external to the casing on a left peripheral side of the casing, the second and fourth rollers defining a left roller pair;

the third roller and the fourth roller sharing a non-nutating axle that is fixed non-rotatably to the casing at a section between the third and fourth rollers;

the axle of the third roller and the axle of the fourth roller are rigidly adjoined at opposing ends of a motor-driven axle and extending angularly therefrom, causing the axles of the third and fourth rollers to be configured to orbit conically about the motor-driven axle;

the conical orbits of the rear roller axles configured to cause the rear roller pair to synchronously nutate about their respective motor-driven axle as the motor continuously rotates;

each roller axle orbit comprising a 360 degree excursion along a nutation circle formed by loci of a distal end of each roller axle, an axis of each nutation circle being coincident with a rotation axis of its corresponding motor-driven axle;

each roller of the rear roller pair having an outer surface configured to be in continuous rolling contact upon the fascia during each roller axle orbit while the device is positioned stationary in the first non-traversing mode;

the right roller pair configured to bear upon a first fascia region comprising a region of the fascia between the right roller pair;

the left roller pair configured to bear upon a second fascia region comprising a region of the fascia between the left roller pair;

the orbiting third and fourth rollers of the motor-driven axle configured to alternately expand and contract a center distance between the right roller pair and a center distance between the left roller pair;

the orbiting rear roller pair configured to produce continuous reciprocating roller motion perpendicular to a fascia surface resulting in percussive massage forces in each of the first fascia region and the second fascia region which are oppositely directed along an X-axis while the device is positioned stationary in the first non-traversing mode.

12. The massage device of claim 1 wherein the massage device is configured to induce continuous reciprocating massage forces upon two adjacent fascia regions when operating in either the first stationary mode or the second freely traversable mode.

* * * * *